(12) United States Patent
Pedzisz

(10) Patent No.: US 12,010,332 B2
(45) Date of Patent: Jun. 11, 2024

(54) VIDEO COMPRESSION BASED ON SPATIAL-TEMPORAL FEATURES

(71) Applicant: Synaptics Incorporated, San Jose, CA (US)

(72) Inventor: Maciej Sebastian Pedzisz, Southampton (GB)

(73) Assignee: Synaptics Incorporated, San Jose, CA (US)

( * ) Notice: Subject to any disclaimer, the term of this patent is extended or adjusted under 35 U.S.C. 154(b) by 0 days.

(21) Appl. No.: 17/861,008

(22) Filed: Jul. 8, 2022

(65) Prior Publication Data

US 2024/0015313 A1  Jan. 11, 2024

(51) Int. Cl.
*H04B 1/00* (2006.01)
*H04N 19/127* (2014.01)
*H04N 19/14* (2014.01)
*H04N 19/182* (2014.01)
*H04N 19/196* (2014.01)

(52) U.S. Cl.
CPC ......... *H04N 19/196* (2014.11); *H04N 19/127* (2014.11); *H04N 19/14* (2014.11); *H04N 19/182* (2014.11)

(58) Field of Classification Search
CPC .... H04N 19/196; H04N 19/127; H04N 19/14; H04N 19/182
USPC ................................. 375/149, 219, 295, 316
See application file for complete search history.

(56) References Cited

U.S. PATENT DOCUMENTS

| | | | |
|---|---|---|---|
| 5,491,519 A | 2/1996 | Kim | |
| 2014/0301468 A1* | 10/2014 | Knee | H04N 19/14 375/240.16 |
| 2015/0332428 A1 | 11/2015 | Kaburlasos et al. | |
| 2016/0142705 A1* | 5/2016 | Fan | H04N 19/172 375/240.13 |

OTHER PUBLICATIONS

Combined Search and Examination Report from Great Britain Patent Application No. GB2310285.8, dated Jan. 19, 2024, pp. 1-6.

* cited by examiner

*Primary Examiner* — Zewdu A Kassa
(74) *Attorney, Agent, or Firm* — Paradice & Li LLP

(57) ABSTRACT

This disclosure provides methods, devices, and systems for video compression. The present implementations more specifically relate to video compression techniques that account for spatial-temporal changes in pixel values. In some aspects, an encoder may determine a change importance factor (CIF) for each image tile of a current image to be encoded. The encoder may calculate the CIF for an image tile of the current image (the "current image tile") based on a degree of variation among the pixel values in the current image tile, a degree of change between the current image tile and a respective image tile of a previously-encoded image (the "previous image tile"), and a degree of variation among the pixel values in the previous image tile. In some implementations, the encoder may determine whether to transmit each of the current image tiles to a receiving device based on the CIF associated with the respective image tile.

18 Claims, 13 Drawing Sheets

VIDEO COMPRESSION BASED ON SPATIAL-TEMPORAL FEATURES

TECHNICAL FIELD

The present implementations relate generally to data compression, and specifically to video compression based on spatial-temporal features.

BACKGROUND OF RELATED ART

A digital video is a sequence of digital images (or "frames") that can be displayed or otherwise rendered in succession (such as by a video playback device). Each digital image can be represented by an array of pixel values (or multiple arrays of pixel values associated with different channels). Some video playback devices may receive the sequence of images, over a communication channel (such as a wired or wireless medium), from a source device (such as an image capture device or video data repository). Due to bandwidth limitations of the communication channel, digital image data is often encoded or compressed prior to transmission by the source device. Data compression is a technique for encoding information into smaller units of data. As such, data compression can be used to reduce the bandwidth or overhead needed to store or transmit video frames over the communication channel.

Adjacent frames of video (such as images displayed successively in time) are likely to be the same or substantially similar in appearance. In other words, the pixel values in adjacent video frames may exhibit little or no change. As such, some video encoders may utilize differential encoding techniques to transmit only the differences in pixel values associated with each successive video frame. However, the encoding and decoding of pixel data requires additional processing (and memory) overhead, which can add latency to the playback of video content. In some resource-constrained environments, differential encoding cannot meet the latency requirements associated with playback of some video content.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

One innovative aspect of the subject matter of this disclosure can be implemented in a method of digital image transmission. The method includes steps of receiving a plurality of first pixel values associated with a first image in a sequence of images; determining a change importance factor (CIF) based on a degree of variation among the plurality of first pixel values, a degree of change between the plurality of first pixel values and a plurality of second pixel values associated with a second image that precedes the first image in the sequence of images, and a degree of variation among the plurality of second pixel values; and selectively transmitting the plurality of first pixel values to a receiving device based at least in part on the CIF.

Another innovative aspect of the subject matter of this disclosure can be implemented in an encoder that includes a processing system and a memory. The memory stores instructions that, when executed by the processing system, cause the encoder to receive a plurality of first pixel values associated with a first image in a sequence of images; determine a CIF based on a degree of variation among the plurality of first pixel values, a degree of change between the plurality of first pixel values and a plurality of second pixel values associated with a second image that precedes the first image in the sequence of images, and a degree of variation among the plurality of second pixel values; and selectively transmit the plurality of first pixel values to a receiving device based at least in part on the CIF.

Another innovative aspect of the subject matter of this disclosure can be implemented in a method of encoding. The method includes steps of receiving a plurality of first pixel values associated with a first image in a sequence of images; determining a CIF based on a degree of variation among the plurality of first pixel values, a degree of change between the plurality of first pixel values and a plurality of second pixel values associated with a second image that precedes the first image in the sequence of images, and a degree of variation among the plurality of second pixel values; and encoding the plurality of first pixel values in accordance with one or more encoding parameters associated with the CIF.

BRIEF DESCRIPTION OF THE DRAWINGS

The present implementations are illustrated by way of example and are not intended to be limited by the figures of the accompanying drawings.

DETAILED DESCRIPTION

Figure 1:
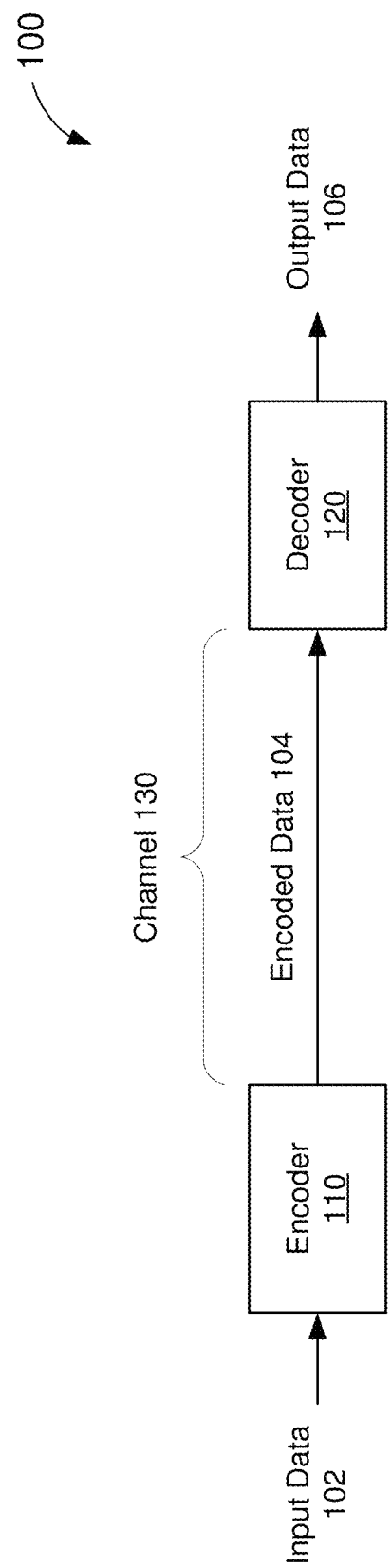
FIG. 1 shows an example communication system for encoding and decoding data.

In the following description, numerous specific details are set forth such as examples of specific components, circuits, and processes to provide a thorough understanding of the present disclosure. The term "coupled" as used herein means connected directly to or connected through one or more intervening components or circuits. The terms "electronic system" and "electronic device" may be used interchangeably to refer to any system capable of electronically processing information. Also, in the following description and for purposes of explanation, specific nomenclature is set forth to provide a thorough understanding of the aspects of the disclosure. However, it will be apparent to one skilled in the art that these specific details may not be required to practice the example embodiments. In other instances, well-known circuits and devices are shown in block diagram form to avoid obscuring the present disclosure. Some portions of the detailed descriptions which follow are presented in terms of procedures, logic blocks, processing and other symbolic representations of operations on data bits within a computer memory.

These descriptions and representations are the means used by those skilled in the data processing arts to most effectively convey the substance of their work to others skilled in the art. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system. It should be borne in mind, however, that all of these and similar terms are to be associated with the appropriate physical quantities and are merely convenient labels applied to these quantities.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example input devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium including instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random-access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors (or a processing system). The term "processor," as used herein may refer to any general-purpose processor, special-purpose processor, conventional processor, controller, microcontroller, and/or state machine capable of executing scripts or instructions of one or more software programs stored in memory.

As described above, adjacent frames of video (such as images displayed successively in time) are likely to be the same or substantially similar in appearance. Thus, some pixel values in adjacent video frames may exhibit little or no change. Further, aspects of the present disclosure recognize that some changes in pixel values may be more readily apparent or discernable to a human observer than others. For example, high-frequency variations among the pixel values in a given image (such as an image of a field of grass) may mask or hide relatively minor changes in pixel values between successive images (such as a video of an insect landing on a blade of grass). By contrast, the same or similar changes in pixel values may be more apparent to a human observer when the surrounding pixel values are relatively flat (such as an image of a blue sky). Aspects of the present disclosure further recognize that existing video compression techniques do not account for how such spatial-temporal changes in pixel values are perceived by the human visual system.

Various aspects relate generally to video compression, and more particularly, to video compression techniques that account for spatial-temporal changes in pixel values. In some aspects, an encoder may determine a change importance factor (CIF) for each image tile of a current video frame (or image) to be encoded. Each image tile is an array of pixel values representing a respective portion of the image. The encoder may calculate the CIF for an image tile of the current video frame (the "current image tile") based on a degree of spatial variation among the pixel values in the current image tile, a degree of temporal change between the current image tile and a respective image tile of a previous video frame (the "previous image tile"), and a degree of spatial variation among the pixel values in the previous image tile. In some implementations, the encoder may determine whether to transmit each of the current image tiles to a receiving device based on the CIF associated with the respective image tile. In some other implementations, the encoder may determine one or more encoding parameters for encoding each of the current image tiles based on the CIF associated with the respective image tile.

Particular implementations of the subject matter described in this disclosure can be implemented to realize one or more of the following potential advantages. By calculating CIFs based on spatial variations and temporal changes in pixel values between successive video frames (or images), a video encoder may encode video data in a manner that is optimized for human visual perception. For example, a higher CIF value may indicate changes to an image tile that are more perceptible to the human eye, whereas a lower CIF value may indicate changes to an image tile that are less perceptible to the human eye (or no change to the image tile). Thus, image tiles can be prioritized for encoding or transmission based on their associated CIF values. For example, image tiles associated with higher CIFs may be transmitted earlier or with less compression (or quantization) than image tiles associated with lower CIFs. When bandwidth, memory, or processing resources are low, the encoder may drop (or refrain from transmitting) image tiles associated with lower CIFs. The dropped tiles may be substituted at the decoder for image tiles from a previously decoded frame. As such, aspects of the present disclosure can improve the efficiency of video compression without increasing the latency of video playback.

FIG. 1 shows an example communication system 100 for encoding and decoding data. The communication system 100 includes an encoder 110 and a decoder 120. In some implementations, the encoder 110 and decoder 120 may be provided in respective communication devices such as, for example, computers, switches, routers, hubs, gateways, cameras, displays, or other devices capable of transmitting or receiving communication signals. In some other implementations, the encoder 110 and decoder 120 may be included in the same device or system.

The encoder 110 receives input data 102 to be transmitted or stored via a channel 130. For example, the channel 130 may include a wired or wireless transmission medium that facilities communications between the encoder 110 and the decoder 120. Alternatively, or in addition, the channel 130 may include a data storage medium. In some aspects, the encoder 110 may be configured to compress the size of the input data 102 to accommodate the bandwidth, storage, or other resource limitations associated with the channel 130. For example, the encoder 110 may encode each unit of input data 102 as a respective "codeword" that can be transmitted or stored over the channel 130 (as encoded data 104). The decoder 120 is configured to receive the encoded data 104, via the channel 130, and decode the encoded data 104 as output data 106. For example, the decoder 120 may decompress or otherwise reverse the compression performed by the encoder 110 so that the output data 106 is substantially similar, if not identical, to the original input data 102.

Data compression techniques can be generally categorized as "lossy" or "lossless." Lossy data compression may result in some loss of information between the encoding and decoding steps. As a result of lossy compression, the output data 106 may be different than the input data 102. Example lossy compression techniques may include, among other examples, transform coding (such as through application of a spatial-frequency transform) and quantization (such as through application of a quantization matrix). In contrast, lossless data compression does not result in any loss of information between the encoding and decoding steps as long as the channel 130 does not introduce errors into the encoded data 104. As a result of lossless compression, the output data 106 is identical to the input data 102. Example lossless compression techniques may include, among other examples, entropy encoding (such as arithmetic coding, Huffman coding, or Golomb coding) and run-length encoding (RLE).

Figure 2:
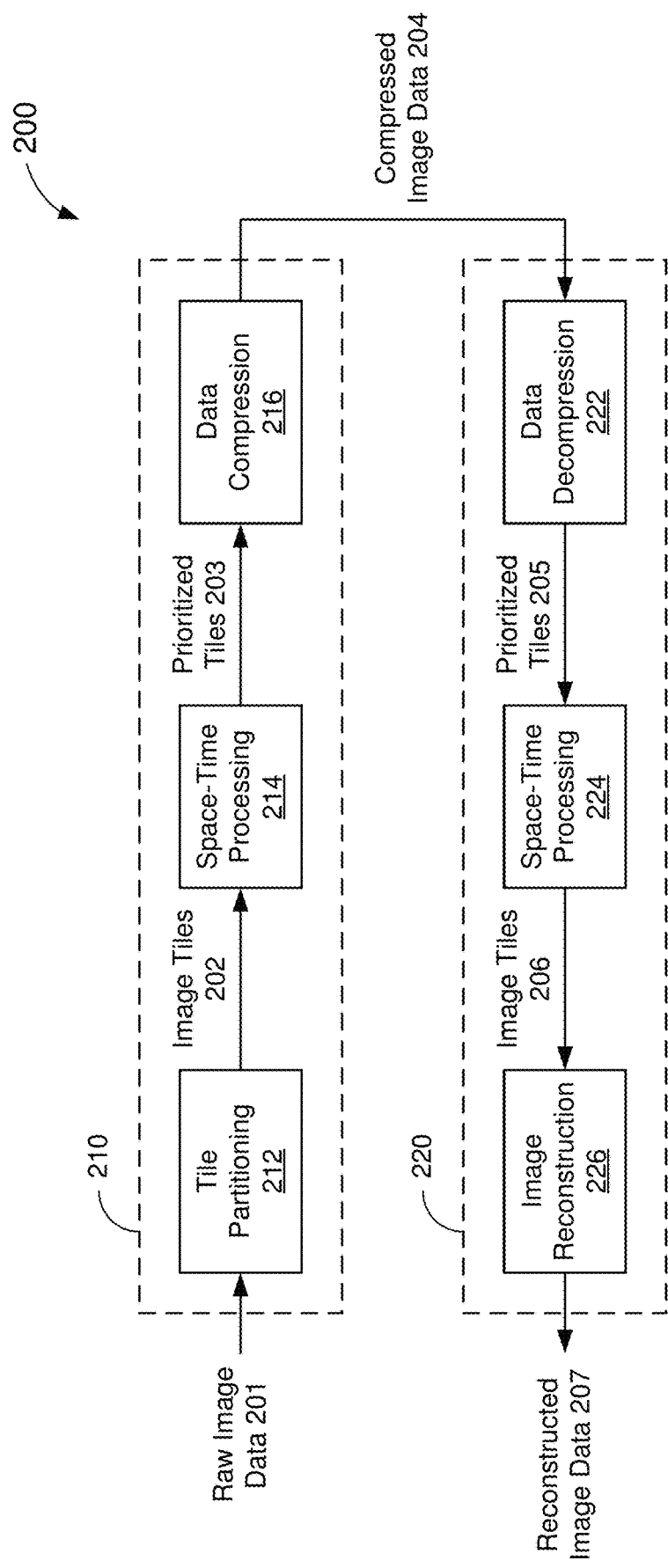
FIG. 2 shows a block diagram of a digital video transmission system, according to some implementations.

FIG. 2 shows a block diagram of a digital video transmission system 200, according to some implementations. The system 200 includes a video encoder 210 and a video decoder 220. In some implementations, the video encoder 210 and the video decoder 220 may be examples of the encoder 110 and decoder 120, respectively, of FIG. 1. Thus, the video encoder 210 may be communicatively coupled to the video decoder 220 via a channel (such as the channel 130 of FIG. 1).

The video encoder 210 is configured to encode raw image data 201, as compressed image data 204, for transmission to the decoder 220. For example, a frame of raw image data 201 may include an array of pixel values (or multiple arrays of pixel values associated with different color channels) representing a digital image or frame of video captured or acquired by an image source (such as a camera or other image output device). In some aspects, the video encoder 210 may transmit a sequence of frames of compressed image data 204 each representing a respective image or frame of a digital video.

The video decoder 220 is configured to decode the compressed image data 204, as reconstructed image data 207, for display on a display device (such as a television, computer monitor, smartphone, or any other device that includes an electronic display). More specifically, the video decoder 220 may reverse the encoding performed by the video encoder 210 so that the reconstructed image data 207 is substantially similar, if not identical, to the raw image data 201. In some aspects, the video decoder 220 may display or render a sequence of frames of reconstructed image data 207 on the display device.

In some implementations, the video encoder 210 may include a tile partitioning component 212, a space-time processing component 214, and a data compression component 216. The tile partitioning component 212 partitions or subdivides each frame of raw image data 201 into a number of image tiles 202. Each image tile 202 includes a subset of pixel values, from the frame of raw image data 201, representing a respective portion or region of the digital image. As used herein, the term "co-located image tiles" refers to image tiles that map to, or are otherwise associated with, the same relative location (such as the top-left corner of an image) in different video frames.

Aspects of the present disclosure recognize that spatial and temporal features associated with co-located image tiles can affect how changes in pixel values are perceived by the human eye. For example, high-frequency variations among the pixel values in a given tile (such as depicting a field of grass) may mask or hide relatively minor changes in pixel values between successive video frames (such as depicting an insect landing on a blade of grass). By contrast, the same or similar changes in pixel values may be more apparent to a human observer when the surrounding pixel values are relatively flat (such as depicting a blue sky).

In some aspects, the space-time processing component 214 may predict how differences in pixel values between co-located image tiles may be perceived by a human observer. In some implementations, the space-time processing component 214 may assign a respective "importance" rating or weight to each of the image tiles 202 based on how perceptible its changes in pixel values are to the human eye. For example, the space-time processing component 214 may assign higher importance ratings to image tiles 202 having more perceptible changes in pixel values and may assign lower importance ratings to image tiles 202 having less perceptible changes in pixel values.

In some implementations, the space-time processing component 214 may output one or more prioritized tiles 203 to the data compression component 216 based on the importance ratings assigned to each of the image tiles 202, where each of the prioritized tiles 203 represents a respective one of the image tiles 202. More specifically, the space-time processing component 214 may prioritize an encoding or transmission of some image tiles 202 over others based on a contribution of each tile to a quality of video playback. Accordingly, the prioritized tiles 203 may be arranged or encoded in a manner that is optimized for human visual perception given the resource constraints of the video transmission system 200.

In some aspects, the space-time processing component 214 may selectively output each image tile 202 (as a prioritized tile 203) based on the importance ratings associated therewith. In some implementations, the space-time processing component 214 may arrange the image tiles 202 for output so that image tiles 202 having higher importance ratings are output earlier than image tiles 202 having lower importance ratings. In some implementations, the space-time processing component 214 may output only a subset of the image tiles 202 having relatively high importance ratings (such as above a threshold). In other words, the space-time processing component 214 may drop (or refrain from outputting) image tiles 202 having relatively low importance ratings.

In some aspects, the space-time processing component 214 may encode or otherwise perform additional processing on the prioritized tiles 203 prior to output. Example suitable encoding techniques may include differential encoding, spatial-frequency transformation, and quantization, among other examples. In some implementations, the space-time processing component 214 may configure one or more parameters for encoding each of the prioritized tiles 203 based on its importance rating. For example, the encoding parameters may be configured so that less information is lost as a result of encoding prioritized tiles 203 having higher importance ratings.

In some implementations, the space-time processing component 214 may perform differential encoding on each prioritized tile 203. In such implementations, the space-time processing component 214 may calculate a predicted value ($\tilde{x}$) associated with each pixel value (x) in a prioritized tile 203 and may output only the differences (d) between the predicted values $\tilde{x}$ and the actual pixel values x (where d=$\tilde{x}$−x). For example, a predicted pixel value $\tilde{x}$ may represent the value of a pixel at a particular location in a previous video frame and the actual pixel value x may represent the value of that pixel in the current video frame (also referred to as a "co-located pixel value"). Assuming the pixel values exhibit little (if any) change between successive video frames, the difference values (d) are likely to be very small (and mostly zeroes).

In some other implementations, the space-time processing component 214 may apply a spatial-frequency transform (such as a discrete cosine transform (DCT) or a wavelet transform) to each prioritized tile 203 that transforms the array of pixel values to a corresponding array of transform coefficients associated with different frequency sub-bands. The space-time processing component 214 may further apply a quantization matrix to the array of transform coefficients, for example, to reduce the amount of data associated with higher-frequency sub-bands (which are generally less perceptible to the human eye). The quantization matrix used in the quantization process may be associated with a desired level of image quality. For example, greater levels of quantization result in greater information loss and thus lower image quality.

The data compression component 216 is configured to compress the prioritized tiles 203 to further reduce the size of data transmissions to the video decoder 220. In some implementations, the data compression component 216 may encode each of the prioritized tiles 203 as one or more codewords, of the compressed image data 204, in accordance with a lossless encoding scheme. For example, entropy encoding is a form of lossless data compression that encodes data values into codewords of varying lengths based on the probability of occurrence of each data value. As such, entropy encoding can substantially reduce the size of differential image data, where co-located pixels in are likely to have the same or similar values.

In some implementations, the video decoder 220 may include a data decompression component 222, a space-time processing component 224, and an image reconstruction component 226. The data decompression component 222 is configured to decode each frame of compressed image data 204 as a set of decompressed prioritized tiles 205. More specifically, the data decompression component 222 may reverse the compression performed by the data compression component 216. For example, the data decompression component 222 may decode the codewords included in a frame of compressed image data 204 (such as in accordance with an entropy coding scheme) to recover the prioritized tiles 203 transmitted by the video encoder 210.

The space-time processing component 224 converts each decompressed prioritized tile 205 to a respective decompressed image tile 206. More specifically, the space-time processing component 224 may reverse any encoding or reordering of image tiles performed by the space-time processing component 214. In some implementations, the space-time processing component 224 may substitute one or more missing image tiles (such as any image tiles 202 not encoded or transmitted by the video encoder 210) with one or more co-located image tiles, respectively, from a previously decoded video frame. Accordingly, the video decoder 220 may "replay" old image tiles 206 having low importance factors.

The image reconstruction component 226 aggregates the decompressed image tiles 206 as reconstructed image data 207. More specifically, the image reconstruction component 226 may reverse the partitioning performed by the tile partitioning component 212, for example, by reassembling the decompressed image tiles 206 into a frame of reconstructed image data 207 that resembles the frame of raw image data 201.

In the example of FIG. 2, the space-time processing component 214 is configured to determine an importance rating for each of the image tiles 202 based on raw pixel values. However, in some other implementations, the same or similar importance ratings can be derived based on pixel values that have been encoded in accordance with one or more image encoding techniques (such as a spatial-frequency transform). In other words, a video encoder may characterize the changes or differences between co-located image tiles in successive video frames according to any suitable metrics or criteria that reflect a human observer's ability to perceive such changes. Accordingly, aspects of the present disclosure can be generally adapted to prioritize the encoding or transmission of some image tiles over other image tiles in a given video frame based on a respective importance rating assigned to each of the image tiles in the video frame.

Figure 3:
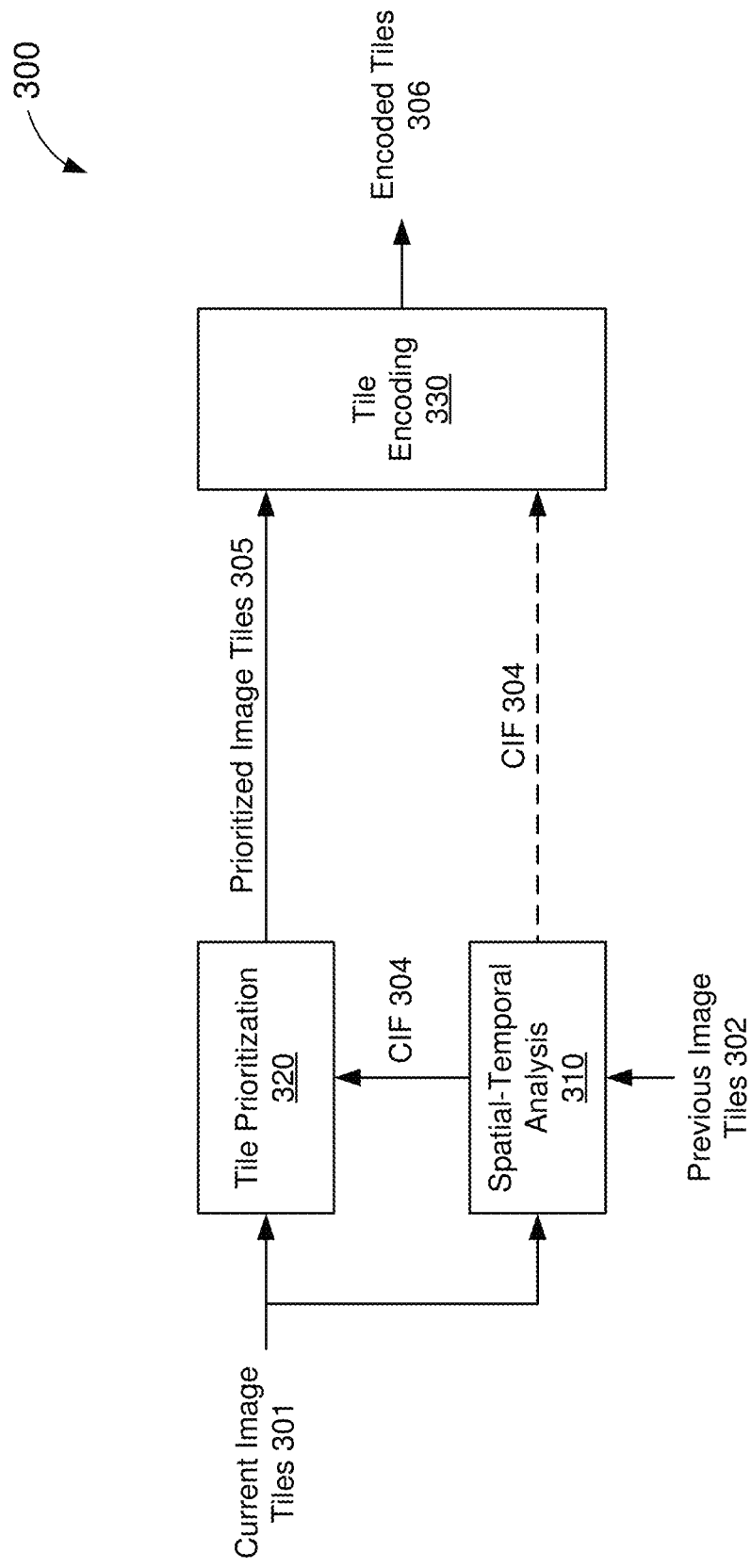
FIG. 3 shows a block diagram of a video compression system, according to some implementations.

FIG. 3 shows a block diagram of a video compression system 300, according to some implementations. In some implementations, the video compression system 300 may be one example of the space-time processing component 214 of FIG. 2. Accordingly, the video compression system 300 may be configured to encode a number of image tiles 301 associated with a current video frame (also referred to as "current image tiles") as a set of encoded tiles 306. With reference for example to FIG. 2, the current image tiles 301 may be examples of the image tiles 202 and the encoded tiles 306 may be examples of the prioritized tiles 203.

The image compression system 300 includes a spatial-temporal analysis component 310, a tile prioritization component 320, and a tile encoding component 330. In some aspects, the spatial-temporal analysis component 310 may determine a respective change importance factor (CIF) 304 for each of the current image tiles 301 based on a respective image tile 302 from a previous video frame (also referred to as a "previous image tile"). More specifically, the spatial-temporal analysis component 310 may compare each current image tile 301 with a co-located previous image tile 302 to detect spatial and temporal features associated with the co-located tiles. Example spatial features may include, among other examples, variations among the pixel values of the current image tile 301 and variations among the pixel values of the previous image tile 302. Example temporal features may include, among other examples, changes in the pixel values of co-located pixels between the current image tile 301 and the previous image tile 302.

Aspects of the present disclosure recognize that temporal changes in pixel values (such as from a previous image tile 302 to a current image tile 301) are more perceptible to the human eye when there is little or no spatial variation among the pixel values (such as in the previous image tile 302 or in the current image tile 301). Thus, in some implementations, the spatial-temporal analysis component 310 may calculate a CIF 304 for a current image tile 301 as a ratio of some degree (or measure) of temporal change between the current image tile 301 and a co-located previous image tile 302 to some degree (or measure) of spatial variation in the current image tile 301 or the previous image tile 302. More specifically, the spatial-temporal analysis component 310 may assign higher CIFs 304 to current image tiles 301 associated with higher degrees of temporal change or lower degrees of spatial variation. By contrast, the spatial-temporal analysis component 310 may assign lower CIFs 304 to current image tiles 301 associated with lower degrees of temporal change or higher degrees of spatial variation.

The tile prioritization component 320 may prioritize the current image tiles 301 based on the CIFs 304 associated therewith. More specifically, the tile prioritization component 320 may output one or more of the current image tiles 301, as prioritized image tiles 305, to the tile encoding component 330. In some aspects, the tile prioritization component 320 may output the current image tiles 301 (as the prioritized image tiles 305) to the tile encoding component 330 by decreasing order of their associated CIFs 304. In other words, the tile prioritization component 320 may output current image tiles 301 associated with higher CIFs 304 earlier than current image tiles 301 associated with lower CIFs 304 so that the current image tile 301 associated with the highest CIF 304 is output first and the current image tile 301 associated with the lowest CIF 304 is output last. In some other aspects, the tile prioritization component 320 may output only a subset of the current image tiles 301 (as prioritized image tiles 305) to the tile encoding component 330 based on their associated CIFs 304.

In some implementations, the tile prioritization component 320 may output only current image tiles 301 associated with CIFs 304 greater than or equal to a threshold value. In other words, the tile prioritization component 320 may drop or otherwise refrain from outputting any current image tiles 301 associated with CIFs less than the threshold value. In such implementations, the number of prioritized image tiles 305 output to the tile encoding component 330 may vary depending on the number of current image tiles 301 associated with CIFs 304 greater than the threshold value. In some other implementations, the tile prioritization component 320 may output only current image tiles 301 associated with an upper (threshold) percentile of CIFs 304. In other words, the tile prioritization component 320 may drop or otherwise refrain from outputting any current image tiles 301 outside the upper percentile of CIFs 304. In such implementations, the number of prioritized image tiles 305 output to the tile encoding component 330 may remain fixed, as a percentage of the total number of current image tiles 301, per video frame.

The tile encoding component 330 may encode the prioritized image tiles 305, for transmission over a channel, as the encoded tiles 306. In some aspects, the tile encoding component 330 may configure one or more parameters for encoding the prioritized image tiles 305 based on the CIFs 304 associated therewith. More specifically, the tile encoding component 330 may select encoding parameters that result in smaller loss of information (or less compression) when encoding prioritized image tiles 305 associated with higher CIFs 304. For example, as described with reference to FIG. 2, the tile encoding component 330 may perform differential encoding on the prioritized image tiles 305 so that the encoded tiles 306 encapsulate only the differences d associated with the prioritized image tiles 305. In some implementations, the tile encoding component 330 may select different differential encoding parameters for different CIFs (or ranges of CIF values) so that encoded tiles 306 associated with higher CIFs 304 include larger difference values d than encoded tiles 306 associated with lower CIFs 304.

In some aspects, the tile encoding component 330 may apply a spatial-frequency transform (such as a DCT or a wavelet transform) to each prioritized image tile 305 that transforms the array of pixel values to a corresponding array of transform coefficients associated with different frequency sub-bands. The tile encoding component 330 may further apply a quantization matrix to the array of transform coefficients, for example, to reduce the amount of data associated with higher-frequency sub-bands (which are generally less perceptible to the human eye). The quantization matrix used in the quantization process may depend on a desired level of image quality. In some implementations, the tile encoding component 330 may apply different quantization matrices to prioritized image tiles 305 associated with different CIFs 304. More specifically, the tile encoding component 330 may apply quantization matrices associated with higher quality levels to prioritized image tiles 305 associated with higher CIFs 304 than to prioritized image tiles 305 associated with lower CIFs 304.

Figure 4:
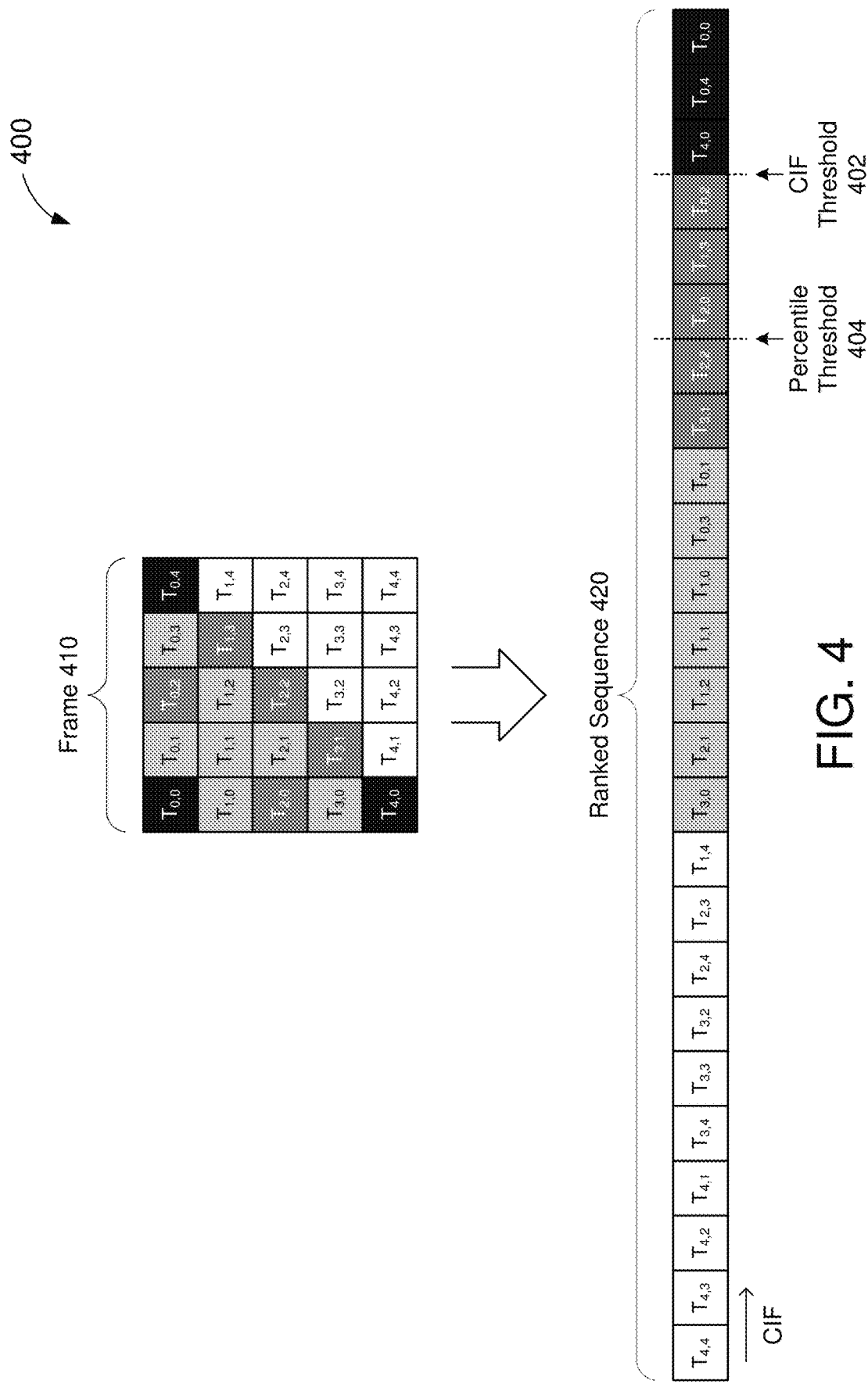
FIG. 4 shows an example mapping of a video frame to a ranked sequence of image tiles.

FIG. 4 shows an example mapping 400 of a video frame 410 to a ranked sequence of image tiles 420. The video frame 410 is partitioned into a number of image tiles $T_{0,0}$-$T_{4,4}$, where each image tile includes an array of pixel values (not shown for simplicity) representing a respective portion of the video frame 410 or image. In the example of FIG. 4, the video frame 410 is depicted as being partitioned into 25 image tiles. In some other implementations, the video frame 410 may be partitioned into any number (M) of image tiles of any dimension.

In some implementations, the mapping 400 may be performed by a video compression system (such as the video compression system 300 of FIG. 3). With reference for example to FIG. 3, each of the image tiles $T_{0,0}$-$T_{4,4}$ may be one example of a current image tile 301. In the example of FIG. 4, the darkness (or shading) of an image tile indicates a respective CIF associated with the image tile. More specifically, image tiles associated with higher CIFs are depicted with a darker shading than image tiles associated with lower CIFs. In some implementations, the CIFs associated with the image tiles $T_{0,0}$-$T_{4,4}$ may be calculated by the spatial-temporal analysis component 310 of FIG. 3 and the mapping 400 may be performed by the tile prioritization component 320. More specifically, the tile prioritization component 320 may arrange the image tiles $T_{0,0}$-$T_{4,4}$, in the ranked sequence 420, by order of their associated CIFs. As a result, the image tile $T_{0,0}$ associated with the highest CIF is mapped to the beginning of the ranked sequence 420 and the image tile $T_{4,4}$ associated with the lowest CIF is mapped to the end of the ranked sequence 420.

In some implementations, the tile prioritization component 320 may output the ranked sequence 420 (as prioritized image tiles 305) to the tile encoding component 330. As such, the tile encoding component 330 receives image tiles associated with higher CIFs before receiving image tiles associated with lower CIFs. In some other implementations, the tile prioritization component 320 may output only the image tiles associated with CIFs greater than a CIF threshold 402. In the example of FIG. 4, the CIF threshold 402 separates the image tiles $T_{0,0}$, $T_{0,4}$, and $T_{4,0}$ from the remaining image tiles in the ranked sequence 420. Thus, the tile encoding component 330 receives only the image tiles $T_{0,0}$, $T_{0,4}$, and $T_{4,0}$. Still further, in some implementations, the tile prioritization component 320 may output only the image tiles associated with CIFs that fall within a percentile threshold 404. In the example of FIG. 4, the percentile threshold 404 represents the upper $25^{th}$ percentile of all CIFs associated with the image tiles $T_{0,0}$-$T_{4,4}$. Thus, the tile encoding component 330 may receive only the image tiles $T_{0,0}$, $T_{0,4}$, $T_{4,0}$, $T_{0,2}$, $T_{1,3}$, and $T_{2,0}$.

Figure 5:
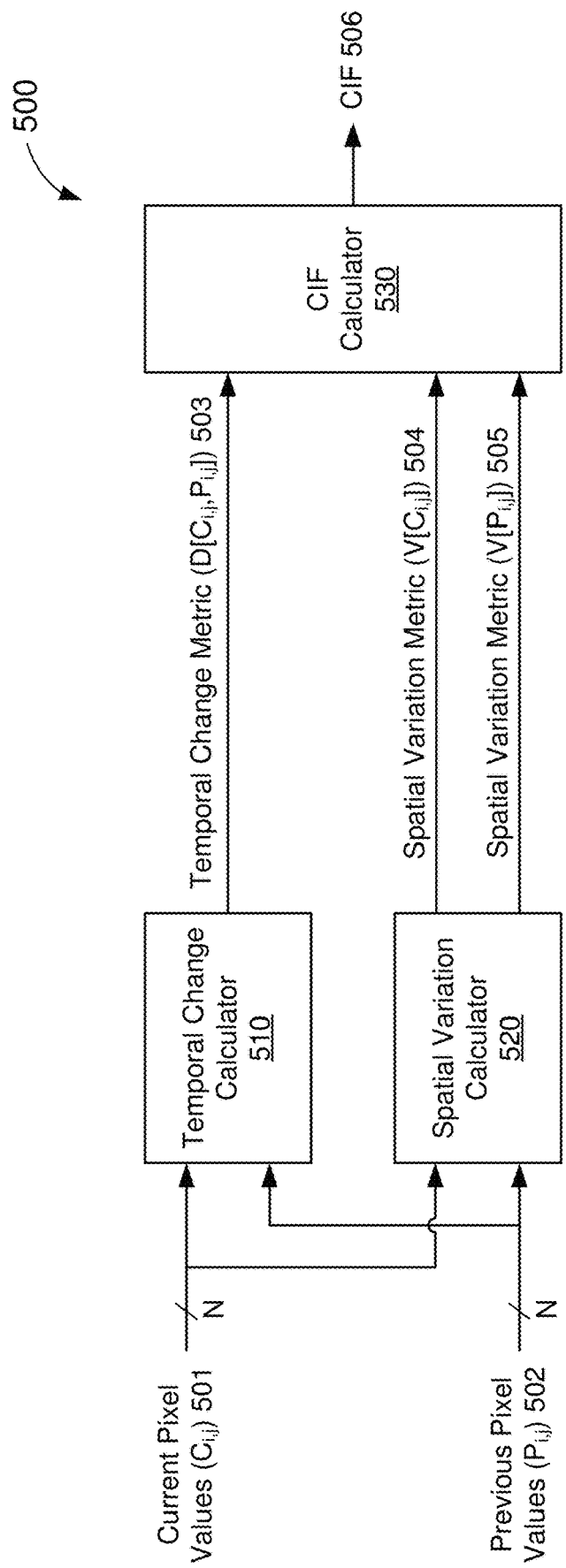
FIG. 5 shows an example image tile spatial-temporal analysis system, according to some implementations.

FIG. 5 shows an example image tile spatial-temporal analysis system 500, according to some implementations. In some implementations, the spatial-temporal analysis system 500 may be one example of the spatial-temporal analysis component 310 of FIG. 3. More specifically, the spatial-temporal analysis system 500 may be configured to calculate a CIF 506 for a current image tile based on a number (N) of pixel values 501 associated with the current image tile and N pixel values 502 associated with a previous image tile. With reference for example to FIG. 3, the current image tile may be one example of any of the current image tiles 301 and the previous image tile may be one example of any of the previous image tiles 302.

The spatial-temporal analysis system 500 includes a temporal change calculator 510, a spatial variation calculator 520, and a CIF calculator 530. The temporal change calculator 510 is configured to calculate a temporal change metric 503 based on differences between the N current pixel values 501 and the N previous pixel values 502. The spatial variation calculator 520 is configured to calculate a first spatial variation metric 504 based on differences among the current pixel values 501 and is further configured to calculate a second spatial variation metric 505 based on differences among the previous pixel values 502. The CIF calculator 530 is configured to calculate the CIF 506 based on the temporal change metric 503, the first spatial variation metric 504, and the second spatial variation metric 505.

The current pixel values 501 are arranged in an array having a number (n) of rows and a number (m) of columns (where n*m=N), where the current pixel value 501 in the $i^{th}$ row and the $j^{th}$ column of the array is denoted $C_{i,j}$. The previous pixel values 502 are also arranged in an array have n rows and m columns, where the previous pixel value 502 in the $i^{th}$ row and the $j^{th}$ column of the array is denoted $P_{i,j}$. In some implementations, the temporal change calculator 510 may calculate the temporal change metric 503 as a maximum of the absolute differences between each pair of co-located pixel values $C_{i,j}$ and $P_{i,j}$. In other words, the temporal change metric 503 can be a function (D) of $C_{i,j}$ and $P_{i,j}$:

$$D[C_{i,j}, P_{i,j}] = \max_{i,j}\{|C_{i,j} - P_{i,j}|\}$$

In some implementations, the spatial variation calculator 520 may calculate the first spatial variation metric 504 as an average (or arithmetic mean) of the differences between each current pixel value $C_{i,j}$ and an average pixel value ($\overline{C_{i,j}}$) associated with the current image tile (where $\overline{C_{i,j}}$ is equal to the mean or average of all N current pixel values $C_{i,j}$). In other words, the first spatial variation metric 504 can be a function (V) of $C_{i,j}$ and $\overline{C_{i,j}}$:

$$V[C_{i,j}] = \frac{1}{N}\sum_{i=1}^{n}\sum_{j=1}^{m}|C_{i,j} - \overline{C_{i,j}}|, \text{ where } \overline{C_{i,j}} \triangleq \frac{1}{N}\sum_{i=1}^{n}\sum_{j=1}^{m}C_{i,j}$$

In some implementations, the spatial variation calculator 520 may calculate the second spatial variation metric 505 as an average (or arithmetic mean) of the differences between each previous pixel value $P_{i,j}$ and an average pixel value ($\overline{P_{i,j}}$) associated with the previous image tile (where $\overline{P_{i,j}}$ is equal to the mean or average of all N current pixel values $P_{i,j}$). In other words, the second spatial variation metric 505 can be a function (V) of $P_{i,j}$ and $\overline{P_{i,j}}$:

$$V[P_{i,j}] = \frac{1}{N}\sum_{i=1}^{n}\sum_{j=1}^{m}|P_{i,j} - \overline{P_{i,j}}|, \text{ where } \overline{P_{i,j}} \triangleq \frac{1}{N}\sum_{i=1}^{n}\sum_{j=1}^{m}P_{i,j}$$

In some implementations, the CIF calculator 530 may calculate the CIF 506 as a ratio of the temporal change metric 503 to the lesser of the first spatial variation metric 504 or the second spatial variation metric 505. In other words, the CIF 506 can be a function of $D[C_{i,j}, P_{i,j}]$, $V[C_{i,j}]$, and $V[P_{i,j}]$:

$$CIF = \frac{D[C_{i,j}, P_{i,j}]}{\min\{V[C_{i,j}], V[P_{i,j}]\} + o}, \text{ where } |o| > 0$$

In the equation above, o is an offset that prevents the denominator from being equal to zero (such as when there is no variation among the pixel values in the current image tile or the previous image tile. In some implementations, the CIF 506 can be normalized to a value between 0 and 1 (where the normalized CIF is represented as $CIF^0$:

$$CIF^0 = 2\sqrt{CIF}$$

Aspects of the present disclosure recognize that some image tiles may perpetually exhibit relatively little spatial variation or temporal changes. However, by prioritizing transmissions of image tiles that exhibit high degrees of spatial-temporal variation, at least some of the image tiles that exhibit lower degrees of spatial-temporal variation may be repeatedly discarded or dropped by the video encoder. Because a video decoder cannot refresh or update image tiles that are dropped by the video encoder, any errors or distortions in co-located image tiles that were previously received by the video decoder may remain on the display for an extended period of time. Such distortions may be referred to as "stuck distortions."

Figure 6:
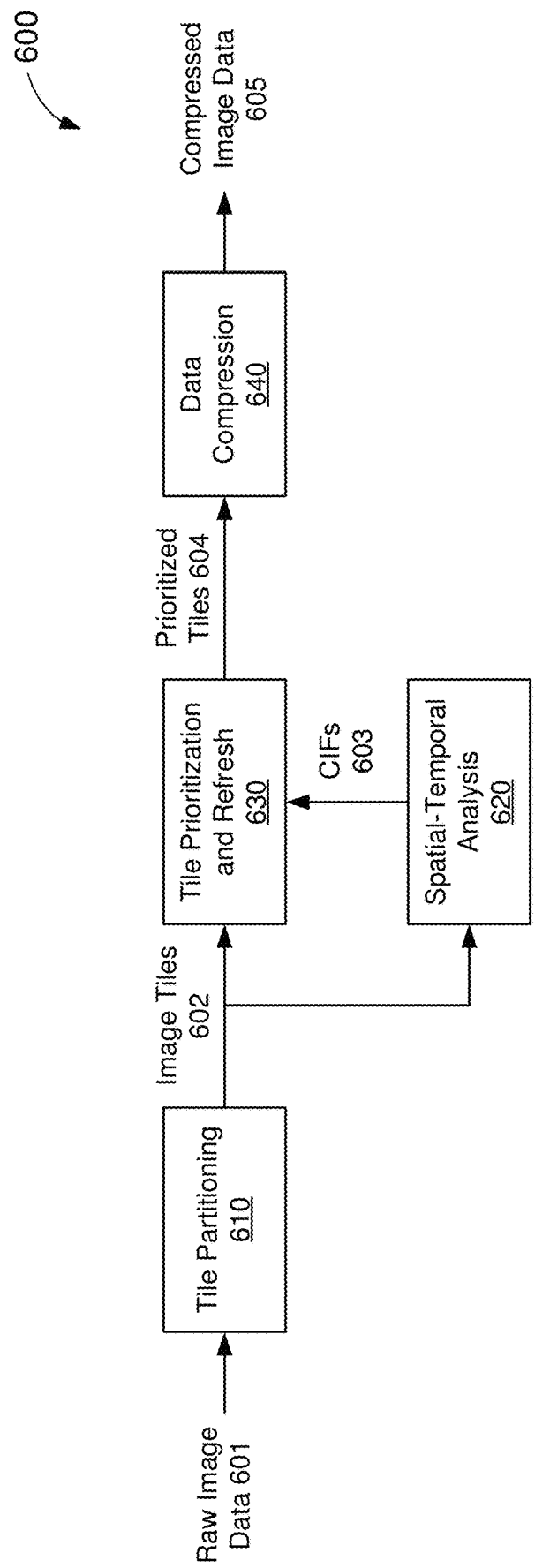
FIG. 6 shows a block diagram of a video encoding system, according to some implementations.

FIG. 6 shows a block diagram of a digital video encoding system 600, according to some implementations. In some implementations, the video encoding system 600 may be one example of the encoder 110 of FIG. 1. Thus, the video encoding system 600 may be communicatively coupled to a video decoder (not shown for simplicity).

The video encoding system 600 is configured to encode raw image data 601, as compressed image data 605, for transmission to the video decoder (such as the video decoder 220 of FIG. 2). For example, a frame of raw image data 601 may include an array of pixel values (or multiple arrays of pixel values associated with different color channels) representing a digital image or frame of video captured or acquired by an image source (such as a camera or other image output device). In some aspects, the video encoding system 600 may transmit a sequence of frames of compressed image data 605 each representing a respective image or frame of a digital video.

In some implementations, the video encoding system 600 may include a tile partitioning component 610, a spatial-temporal analysis component 620, a tile prioritization and refresh component 630, and a data compression component 640. The tile partitioning component 610 partitions or subdivides each frame of raw image data 601 into a number of image tiles 602. Each image tile 602 includes a subset of pixel values, from the frame of raw image data 601, representing a respective portion or region of the digital image. In some implementations, the spatial-temporal analysis component 620 may be one example of the spatial-temporal analysis component 310 of FIG. 3 or the spatial-temporal analysis system 500 system of FIG. 5. More specifically, the spatial-temporal analysis component 620 compares each image tile 602 with a co-located image tile from a previous video frame to determine a CIF 603 for the current image tile 602 (such as described with reference to FIGS. 3 and 5).

In some aspects, the tile prioritization and refresh component 630 may prioritize the current image tiles 602 based, at least in part, on the CIFs 603 generated by the spatial-temporal analysis component 620. More specifically, the tile prioritization and refresh component 630 may output one or more of the image tiles 602, as prioritized tiles 604, to the data compression component 640. In some implementations, the prioritized tiles 604 may include only the image tiles 602 associated with CIFs 603 greater than or equal to a threshold value. In other words, the tile prioritization and refresh component 630 may drop any image tiles 602 associated with CIFs less than the threshold value. In some other implementations, the prioritized tiles 604 may include only the image tiles 602 associated with an upper (threshold) percentile of CIFs 603. In other words, the tile prioritization and refresh component 630 may drop any image tiles 602 outside the upper percentile of CIFs 304.

As described above, some image tiles 602 may exhibit relatively little spatial variation or temporal changes across several video frames. In some aspects, the tile prioritization and refresh component 630 may periodically update or refresh co-located image tiles that have not been transmitted for a threshold period of time, for example, to avoid stuck distortions at the video decoder (or display device). In other words, the tile prioritization and refresh component 630 may selectively transmit an image tile 602 based on whether it has previously transmitted any co-located image tiles over a threshold number of video frames. If a threshold number of co-located image tiles have been consecutively dropped, the tile prioritization and refresh component 630 may output the current image tile 602 (as a prioritized tile 604) even if it fails to meet the threshold for transmission given the CIF 603 determined by the spatial-temporal analysis component 620.

In some implementations, the tile prioritization and refresh component 630 may adjust the CIF 603 associated with a given image tile 602 based on a number of co-located image tiles that were consecutively dropped across previous video frames. For example, the tile prioritization and refresh component 630 may increment or otherwise increase the CIF 603 for a given image tile 602 if a co-located image tile was not transmitted (or "refreshed") in the preceding video frame. The amount or degree by which the CIF 603 is increased may depend on the number of consecutively dropped image tiles. For example, with each successive video frame in which a co-located image tile is dropped, the tile prioritization and refresh component 630 may increase a count value added to the CIF 603 associated with the current image tile 602 co-located with the previously dropped image tile. Once an image tile 602 meets the requirements for transmission (as a prioritized tile 604), the tile prioritization and refresh component 630 may reset the count value added to its CIF 603. In other words, the tile prioritization and refresh component 630 may not adjust or increase the CIFs 603 associated with recently refreshed image tiles 602.

In some aspects, the tile prioritization and refresh component 630 may encode or otherwise perform additional processing on the prioritized tiles 604 prior to output. In some implementations, the tile prioritization and refresh component 630 may perform differential encoding on each of the prioritized tiles 604 (such as described with reference to FIGS. 2 and 3). In some other implementations, the tile prioritization and refresh component 630 may apply a spatial-frequency transform (such as a DCT or wavelet transform), and a quantization matrix, to each of the prioritized tiles 604 (such as described with reference to FIGS. 2 and 3). In some implementations, the tile prioritization and refresh component 630 may configure one or more parameters for encoding each of the prioritized tiles 604 based on its associated CIF 603. For example, the encoding parameters may be configured so that less information is lost as a result of encoding prioritized tiles 604 associated with higher CIFs 603.

The data compression component 640 may be one example of the data compression component 216 of FIG. 2. Thus, the data compression component 640 may compress the prioritized tiles 604 to further reduce the size of data transmissions to the video decoder. In some implementations, the data compression component 640 may encode the prioritized tiles 604 as one or more codewords, of the compressed image data 605, in accordance with a lossless encoding scheme. As described above, entropy encoding is a form of lossless data compression that encodes data values into codewords of varying lengths based on the probability of occurrence of each data value. As such, entropy encoding can substantially reduce the size of differential image data, where co-located pixels in are likely to have the same or similar values.

Figure 7:
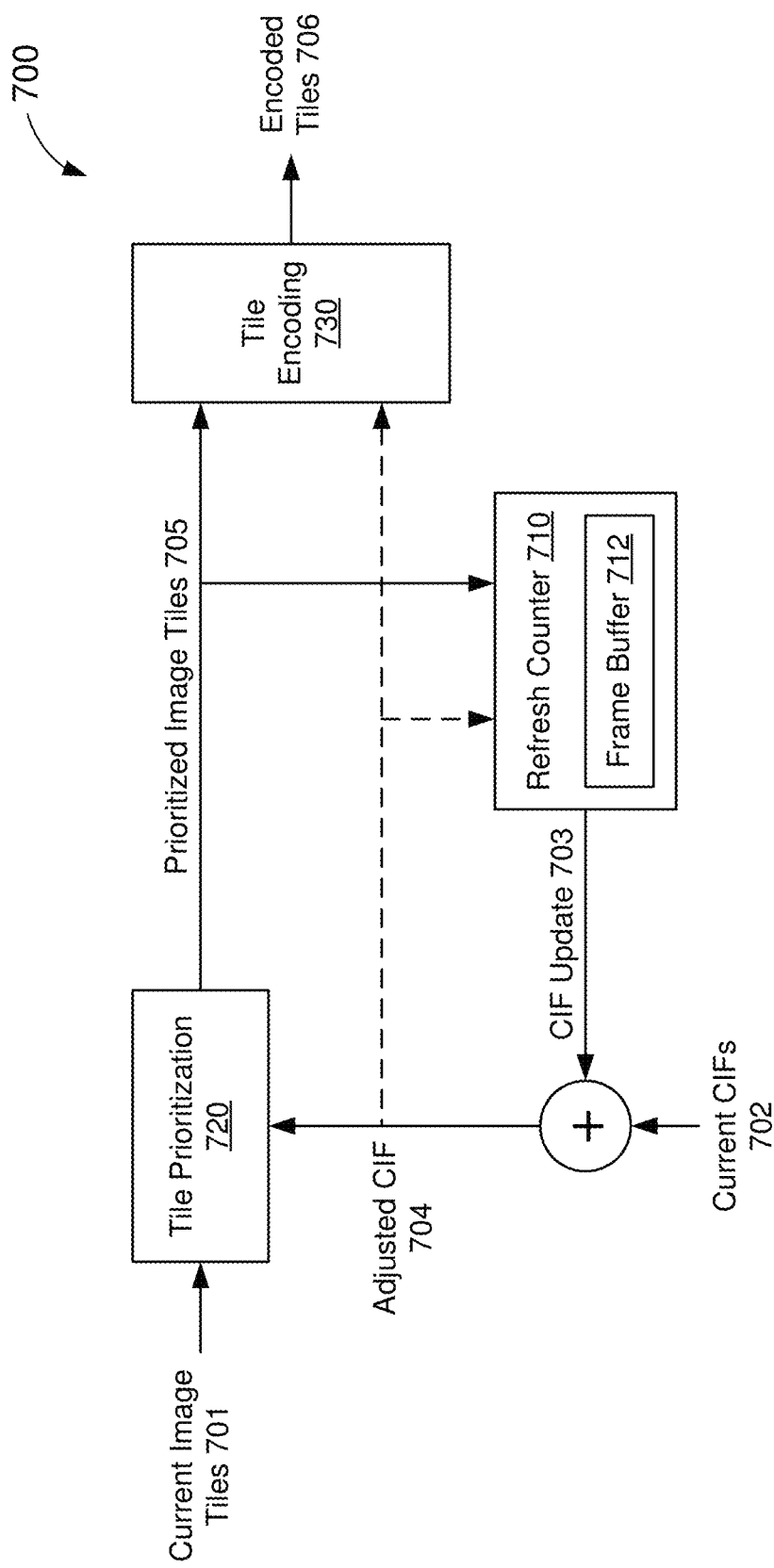
FIG. 7 shows a block diagram of another video compression system, according to some implementations.

FIG. 7 shows a block diagram of another video compression system 700, according to some implementations. In some implementations, the video compression system 700 may be one example of the tile prioritization and refresh component 630 of FIG. 6. Accordingly, the video compression system 700 may be configured to encode a number of current image tiles 701 as a set of encoded tiles 706 based, at least in part, on a current CIF 702 associated with each current image tile 701. Thus, the current image tiles 701, the current CIFs 702, and the encoded tiles 706 may be examples of the image tiles 602, the CIFs 603, and the prioritized tiles 604, respectively, of FIG. 6.

The image compression system 700 includes a refresh counter 710, a tile prioritization component 720, and a tile encoding component 730. In some aspects, the refresh counter 710 may generate a respective CIF update value 703 for each of the current CIFs 702. In some implementations, the refresh counter 710 may include a frame buffer 712 that stores a number (M) of count values each associated with a respective image tile of a video frame (where each video frame is partitioned into M image tiles). The CIF update 703 is added to, or otherwise combined with, the current CIF 702 associated with the current image tile 701 to produce an adjusted CIF 704. The tile prioritization component 720 may prioritize the current image tiles 701 based on the adjusted CIFs 704 associated therewith. More specifically, the tile prioritization component 720 may selectively output one or more of the current image tiles 701, as prioritized image tiles 705, based on the adjusted CIFs 704.

In some implementations, the tile prioritization component 720 may output only the current image tiles 701 associated with adjusted CIFs 704 greater than or equal to a threshold value. In other words, the tile prioritization component 720 may drop or otherwise refrain from outputting any current image tiles 701 associated with CIFs less than the threshold value (such as described with reference to FIGS. 3 and 4). In some other implementations, the tile prioritization component 720 may output only current image tiles 701 associated with an upper (threshold) percentile of adjusted CIFs 704. In other words, the tile prioritization component 720 may drop or otherwise refrain from outputting any current image tiles 701 outside the upper percentile of CIFs 704 (such as described with reference to FIGS. 3 and 4).

In some aspects, the refresh counter 710 may update or adjust the CIF update value 703 associated with a current image tile 701 based on whether the tile prioritization component 720 outputs the current image tile 701 as a prioritized image tile 705. In some implementations, the refresh counter 710 may increment or otherwise increase the CIF update values 703 associated with any current image tiles 701 that are dropped by the tile prioritization component 720 (such as any of the M image tiles not output as prioritized image tiles 705). For example, where a dropped image tile 701 represents the $i^{th}$ image tile of the current video frame (where $1 \leq i \leq M$), the refresh counter 710 may increment the CIF update value 703 stored in the frame buffer 712 for the $i^{th}$ image tile. Upon receiving a subsequent video frame, the refresh counter 710 adds the new CIF update value 703 to the current CIF 702 associated with the $i^{th}$ image tile in the video frame to produce an even higher adjusted CIF 704. After one or more video frames, the adjusted CIF 704 stored in the frame buffer 712 for the $i^{th}$ image tile will be high enough to cause the tile prioritization component 720 to output the $i^{th}$ image tile as a prioritized image tile 705.

In some other implementations, the refresh counter 710 may reset the CIF update values 703 associated with any current image tiles 701 that are output by the tile prioritization component 720 as prioritized image tiles 705. For example, where a prioritized image tile 705 represents the $j^{th}$ image tile of the current video frame (where $1 \leq j \leq M$), the refresh counter 710 may reset the CIF update value 703 stored in the frame buffer 712 for the $j^{th}$ image tile (such as by setting the CIF update value 703 to zero). Upon receiving a subsequent video frame, the refresh counter 710 adds the new CIF update value 703 to the current CIF 702 associated with the $j^{th}$ image tile in the video frame. However, because the CIF update value 703 associated with the $j^{th}$ image tile has been reset, the CIF update value 703 will not affect the current CIF 702 associated with the $j^{th}$ image tile in the video frame. In other words, the adjusted CIF 704 associated with the $j^{th}$ image tile will be equal to the current CIF 702 in the subsequent video frame.

In the example of FIG. 7, the size of the CIF updates 703 (or the size of each incremental adjustment) determines the frequency with which the M image tiles are refreshed. For example, the refresh counter 710 can cause the tile prioritization component 720 to refresh image tiles more frequently by incrementing the CIF update values 703 by larger amounts. On the other hand, the refresh counter 710 can cause the tile prioritization component 720 to refresh image tiles less frequently by incrementing the CIF update values 703 by smaller amounts.

Some image tiles may exhibit no spatial variation or temporal change across multiple video frames (such as image tiles depicting a relatively flat or static background across several frames of video). Such image tiles may be referred to as "static image tiles" and are associated with CIFs equal to zero. Aspects of the present disclosure recognize that refreshing static image tiles may unnecessarily consume limited processing resources (or otherwise result in an inefficient allocation of processing resources). Thus, in some aspects, the refresh counter 710 may refrain from incrementing any CIF update values 703 associated with static image tiles. In such aspects, the refresh counter 710 may selectively increment the CIF update value 703 for a given image tile based on whether the adjusted CIF 704 for the image tile is equal to zero. For example, if the adjusted CIF 704 associated with the $k^{th}$ image tile is equal to zero, the refresh counter 710 may not increment the CIF update value 703 stored in the frame buffer 712 for the $k^{th}$ image tile even though the $k^{th}$ image tile is dropped by the tile prioritization component 720. As such, the CIF update value 703 associated with the $k^{th}$ image tile may remain zero for the next video frame.

The tile encoding component 730 may encode the prioritized image tiles 705, for transmission over a channel, as the encoded tiles 706. In some aspects, the tile encoding component 730 may configure one or more parameters for encoding the prioritized image tiles 705 based on the adjusted CIFs 704 associated therewith. More specifically, the tile encoding component 730 may select encoding parameters that result in smaller loss of information (or less compression) when encoding prioritized image tiles 705 associated with higher adjusted CIFs 704. In some aspects, the tile encoding component 730 may perform differential encoding on the prioritized image tiles 705 so that the encoded tiles 706 encapsulate only the differences d associated with the prioritized image tiles 705. In some implementations, the tile encoding component 730 may select different differential encoding parameters for different CIFs (or ranges of CIF values) so that encoded tiles 706 associated with higher adjusted CIFs 704 include larger difference values d than encoded tiles 706 associated with lower adjusted CIFs 704.

In some other aspects, the tile encoding component 730 may apply a spatial-frequency transform (such as a DCT or wavelet transform) to each prioritized image tile 705 that transforms the array of pixel values to a corresponding array of transform coefficients associated with different frequency sub-bands. The tile encoding component 730 may further apply a quantization matrix to the array of transform coefficients, for example, to reduce the amount of data associated with higher-frequency sub-bands. The quantization matrix used in the quantization process may depend on a desired level of image quality. In some implementations, the tile encoding component 730 may apply different quantization matrices to prioritized image tiles 705 associated with different CIFs 704. More specifically, the tile encoding component 730 may apply quantization matrices associated with higher quality levels to prioritized image tiles 705 associated with higher adjusted CIFs 704 than to prioritized image tiles 705 associated with lower adjusted CIFs 704.

Figure 8A:
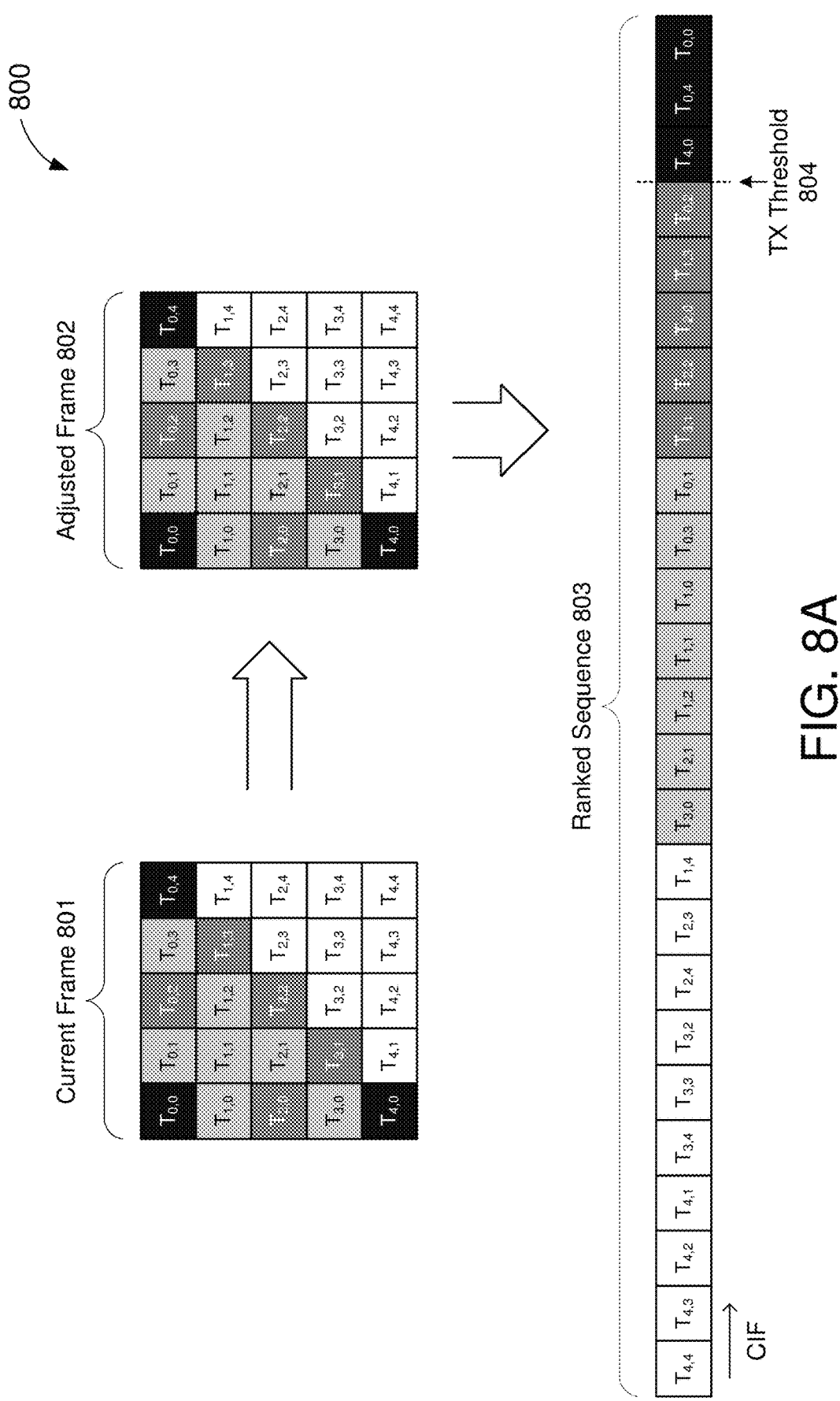
FIGS. 8A-8C show example mappings of video frames to ranked sequences of image tiles.
Figure 8B:
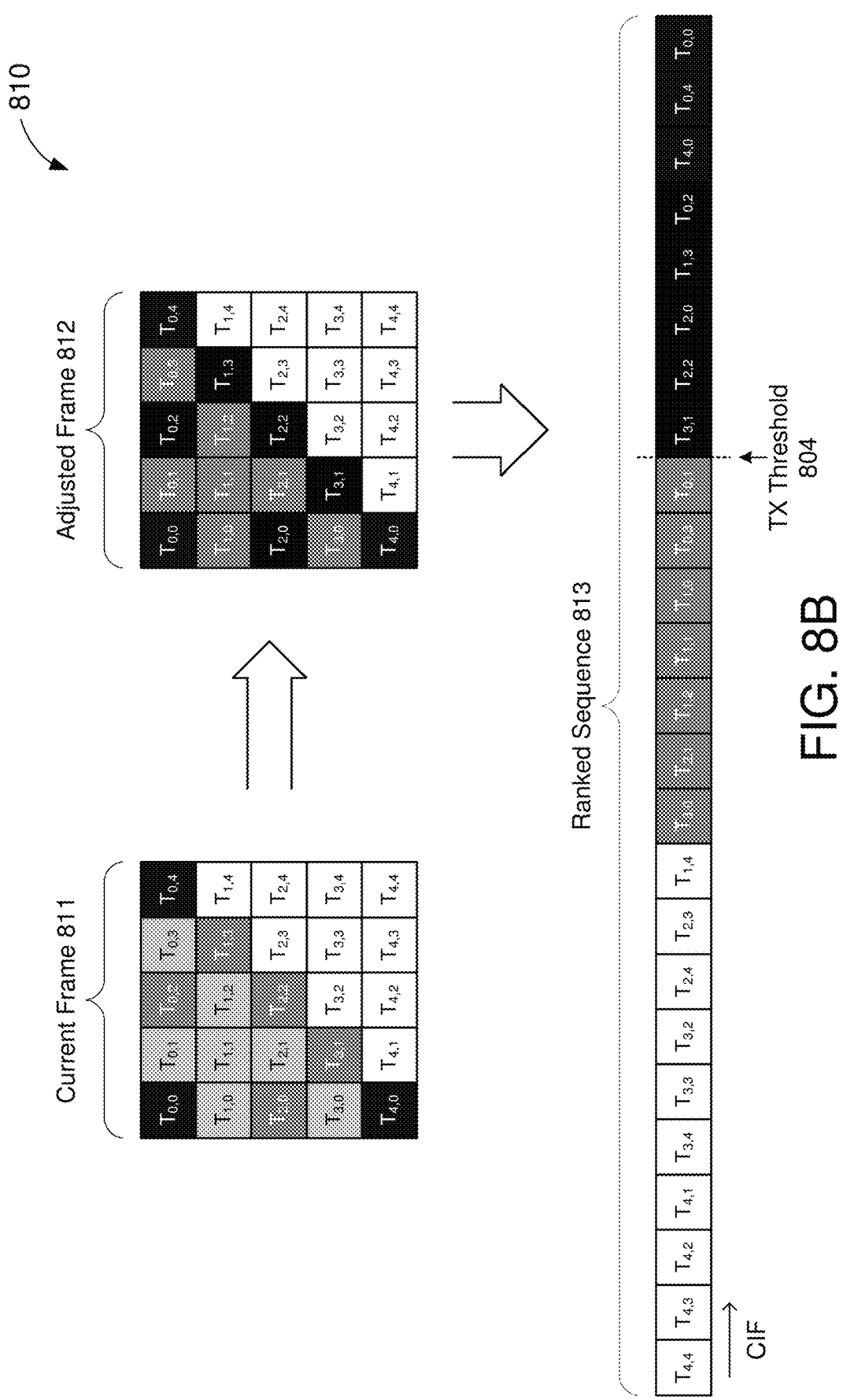
Figure 8C:
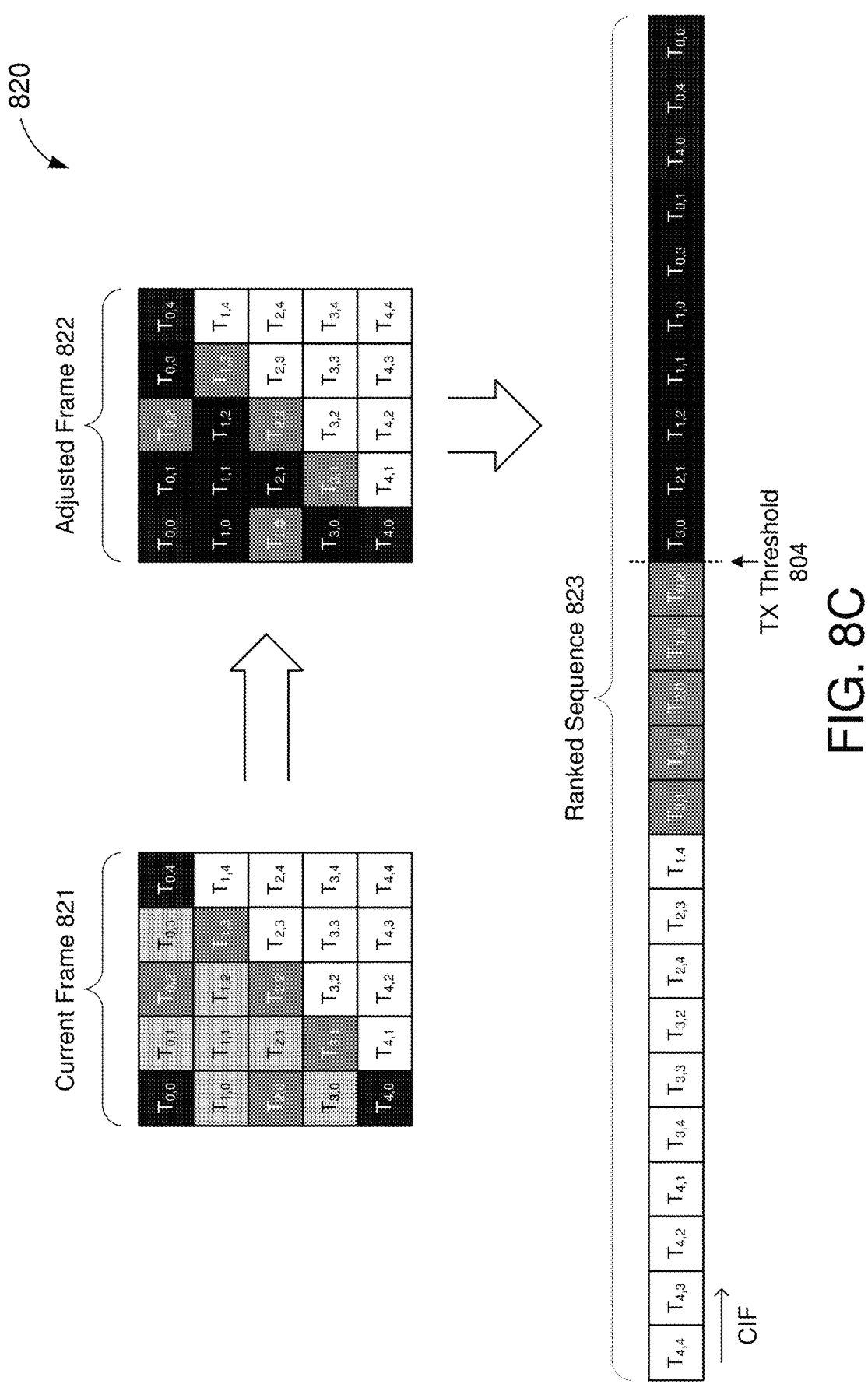

FIGS. 8A-8C show example mappings 800, 810, and 820 of video frames 801, 811, and 821 to ranked sequences of image tiles 803, 813, and 823, respectively. More specifically, the video frame 801 represents the first frame in a sequence of video frames, the video frame 811 represents the second frame (immediately following the first frame 801) in the sequence of video frames, and the video frame 821 represents the third frame (immediately following the second frame 811) in the sequence of video frames.

Each of the video frames 801, 811, and 821 is partitioned into a number of image tiles $T_{0,0}$-$T_{4,4}$, where each image tile includes an array of pixel values (not shown for simplicity) representing a respective portion of the video frame or image. In the example of FIGS. 8A-8C, each of the video frames 801, 811, and 821 is depicted as being partitioned into 25 image tiles. In some other implementations, the video frames 801, 811, and 821 may be partitioned into any number (M) of image tiles of any dimension.

In some implementations, each of the mappings 800, 810, and 820 may be performed by a video compression system (such as the video compression system 700 of FIG. 7). With reference for example to FIG. 7, each of the image tiles $T_{0,0}$-$T_{4,4}$ may be one example of a current image tile 701. In the example of FIGS. 8A-8C, image tiles with darker shading are associated with higher CIFs. In some implementations, the CIFs associated with the image tiles $T_{0,0}$-$T_{4,4}$ in each of the current frames 801, 811, and 821 may be calculated by the spatial-temporal analysis component 620 of FIG. 6 and may be further adjusted by the refresh counter 710 of FIG. 7 to produce adjusted frames 802, 812, and 822.

In some implementations, each of the mappings 800, 810, and 820 may be performed by the tile prioritization component 720 of FIG. 7. More specifically, the tile prioritization component 720 may arrange the image tiles $T_{0,0}$-$T_{4,4}$ in each of the ranked sequences 803, 813, and 823 by order of their adjusted CIFs. As a result, the image tile associated with the highest adjusted CIF is mapped to the beginning of each of the ranked sequences 803, 813, and 823 and the image tile associated with the lowest adjusted CIF is mapped to the end of each of the ranked sequences 803, 813, and 823.

In some implementations, the tile prioritization component 720 may output, to the encoding component 730, only the image tiles associated with adjusted CIFs greater than a transmit (TX) threshold 804. In the example of FIGS. 8A-8C, the TX threshold 804 is depicted as a CIF threshold (such as the CIF threshold 402 of FIG. 4). More specifically, the TX threshold 804 is set to include only the image tiles associated with the highest adjusted CIFs (shown in black). However, different TX thresholds can be used in some other implementations (such as a different CIF threshold or a percentile threshold).

With reference to FIG. 8A, the current frame 801 represents the first frame in the sequence of video frames. As such, no adjustments or updates are performed on any of the image tiles $T_{0,0}$-$T_{4,4}$ in the current frame 801. With reference for example to FIG. 7, the frame buffer 712 may store a respective CIF update value 703 equal to zero for each of the image tiles $T_{0,0}$-$T_{4,4}$. Thus, each of the CIFs in the adjusted frame 802 is identical to a respective CIF in the current frame 801. In the example of FIG. 8A, only the image tiles $T_{0,0}$, $T_{0,4}$, and $T_{4,0}$ in the adjusted frame 802 are associated with CIFs that meet the TX threshold 804. As a result, only the image tiles $T_{0,0}$, $T_{0,4}$, and $T_{4,0}$ may be encoded and transmitted to a video decoder.

Because some of the image tiles in the current frame 801 have not been transmitted, the refresh counter 710 may increment the CIF update values 703 stored in the frame buffer 712 for one or more of the dropped image tiles. In the example of FIG. 8A, the image tiles $T_{1,4}$, $T_{2,3}$, $T_{2,4}$, $T_{3,2}$, $T_{3,3}$, $T_{3,4}$, $T_{4,1}$, $T_{4,2}$, $T_{4,3}$, and $T_{4,4}$ are associated with CIFs equal to zero. Thus, the refresh counter 710 may not increment the CIF update values 703 associated with any of the image tiles $T_{0,0}$, $T_{0,4}$, $T_{4,0}$, $T_{1,4}$, $T_{2,3}$, $T_{2,4}$, $T_{3,2}$, $T_{3,3}$, $T_{3,4}$, $T_{4,1}$, $T_{4,2}$, $T_{4,3}$, or $T_{4,4}$. In other words, the refresh counter 710 may only increment the CIF update values 703 stored in the frame buffer 712 (to a non-zero value) for the image tiles $T_{0,2}$, $T_{1,3}$, $T_{2,0}$, $T_{2,2}$, $T_{3,1}$, $T_{0,1}$, $T_{0,3}$, $T_{1,0}$, $T_{1,1}$, $T_{1,2}$, $T_{2,1}$, and $T_{3,0}$.

With reference to FIG. 8B, the current frame 811 represents the second frame in the sequence of video frames. At this time, the frame buffer 712 stores non-zero CIF update values 703 for the image tiles $T_{0,2}$, $T_{1,3}$, $T_{2,0}$, $T_{2,2}$, $T_{3,1}$, $T_{0,1}$, $T_{0,3}$, $T_{1,0}$, $T_{1,1}$, $T_{1,2}$, $T_{2,1}$, and $T_{3,0}$. The refresh counter 710 may add the non-zero CIF update values 703 to the CIFs associated with respective image tiles in the current frame 811 so that the CIFs associated with the image tiles $T_{0,2}$, $T_{1,3}$, $T_{2,0}$, $T_{2,2}$, $T_{3,1}$, $T_{0,1}$, $T_{0,3}$, $T_{1,0}$, $T_{1,1}$, $T_{1,2}$, $T_{2,1}$, and $T_{3,0}$ in the adjusted frame 812 are higher than the CIFs associated with the same image tiles in the current frame 811. As shown in FIG. 8B, the image tiles $T_{0,0}$, $T_{0,4}$, $T_{4,0}$, $T_{0,2}$, $T_{1,3}$, $T_{2,0}$, $T_{2,2}$, and $T_{3,1}$ in the adjusted frame 812 are associated with CIFs that meet the TX threshold 804 and may thus be encoded and transmitted to a video decoder.

The refresh counter 710 may subsequently reset the CIF update values 703 stored in the frame buffer 712 for each of the transmitted image tiles $T_{0,0}$, $T_{0,4}$, $T_{4,0}$, $T_{0,2}$, $T_{1,3}$, $T_{2,0}$, $T_{2,2}$, and $T_{3,1}$. Because some of the image tiles in the current frame 811 have not been transmitted, the refresh counter 710 may further increment the CIF update values 703 stored in the frame buffer 712 for one or more of the dropped image tiles. In the example of FIG. 8B, the image tiles $T_{1,4}$, $T_{2,3}$, $T_{2,4}$, $T_{3,2}$, $T_{3,3}$, $T_{3,4}$, $T_{4,1}$, $T_{4,2}$, $T_{4,3}$, and $T_{4,4}$ are associated with CIFs equal to zero. Thus, the refresh counter 710 may not increment the CIF update values 703 associated with any of the image tiles $T_{0,0}$, $T_{0,4}$, $T_{4,0}$, $T_{0,2}$, $T_{1,3}$, $T_{2,0}$, $T_{2,2}$, $T_{3,1}$, $T_{1,4}$, $T_{2,3}$, $T_{2,4}$, $T_{3,2}$, $T_{3,3}$, $T_{3,4}$, $T_{4,1}$, $T_{4,2}$, $T_{4,3}$, or $T_{4,4}$. In other words, the refresh counter 710 may further increment the CIF update values 703 stored in the frame buffer 712 for the image tiles $T_{0,1}$, $T_{0,3}$, $T_{1,0}$, $T_{1,1}$, $T_{1,2}$, $T_{2,1}$, and $T_{3,0}$.

With reference to FIG. 8C, the current frame 821 represents the third frame in the sequence of video frames. At this time, the frame buffer 712 stores non-zero CIF update values 703 for the image tiles $T_{0,1}$, $T_{0,3}$, $T_{1,0}$, $T_{1,1}$, $T_{1,2}$, $T_{2,1}$, and $T_{3,0}$ (which are higher than the CIF update values 703 applied to the same image tiles in the second frame 811). The refresh counter 710 may add the non-zero CIF update values 703 to the CIFs associated with respective image tiles in the current frame 821 so that the CIFs associated with the image tiles $T_{0,1}$, $T_{0,3}$, $T_{1,0}$, $T_{1,1}$, $T_{1,2}$, $T_{2,1}$, and $T_{3,0}$ in the adjusted frame 822 are higher than the CIFs associated with the same image tiles in the current frame 821. As shown in FIG. 8C, the image tiles $T_{0,0}$, $T_{0,4}$, $T_{4,0}$, $T_{0,1}$, $T_{0,3}$, $T_{1,0}$, $T_{1,1}$, $T_{1,2}$, $T_{2,1}$, and $T_{3,0}$ in the adjusted frame 822 are associated with CIFs that meet the TX threshold 804 and may thus be encoded and transmitted to a video decoder.

The refresh counter 710 may subsequently reset the CIF update values 703 stored in the frame buffer 712 for each of the transmitted image tiles $T_{0,0}$, $T_{0,4}$, $T_{4,0}$, $T_{0,1}$, $T_{0,3}$, $T_{1,0}$, $T_{1,1}$, $T_{1,2}$, $T_{2,1}$, and $T_{3,0}$. Because some of the image tiles in the current frame 821 have not been transmitted, the refresh counter 710 may further increment the CIF update values 703 stored in the frame buffer 712 for one or more of the dropped image tiles. In the example of FIG. 8C, the image tiles $T_{1,4}$, $T_{2,3}$, $T_{2,4}$, $T_{3,2}$, $T_{3,3}$, $T_{3,4}$, $T_{4,1}$, $T_{4,2}$, $T_{4,3}$, and $T_{4,4}$ are associated with CIFs equal to zero. Thus, the refresh counter 710 may not increment the CIF update values 703 associated with any of the image tiles $T_{0,0}$, $T_{0,4}$, $T_{4,0}$, $T_{0,1}$, $T_{0,3}$, $T_{1,0}$, $T_{1,1}$, $T_{1,2}$, $T_{2,1}$, $T_{3,0}$, $T_{1,4}$, $T_{2,3}$, $T_{2,4}$, $T_{3,2}$, $T_{3,3}$, $T_{3,4}$, $T_{4,1}$, $T_{4,2}$, $T_{4,3}$, or $T_{4,4}$. In other words, the refresh counter 710 may further increment the CIF update values 703 stored in the frame buffer 712 for the image tiles $T_{0,2}$, $T_{1,3}$, $T_{2,0}$, $T_{2,2}$, and $T_{3,1}$.

Figure 9:
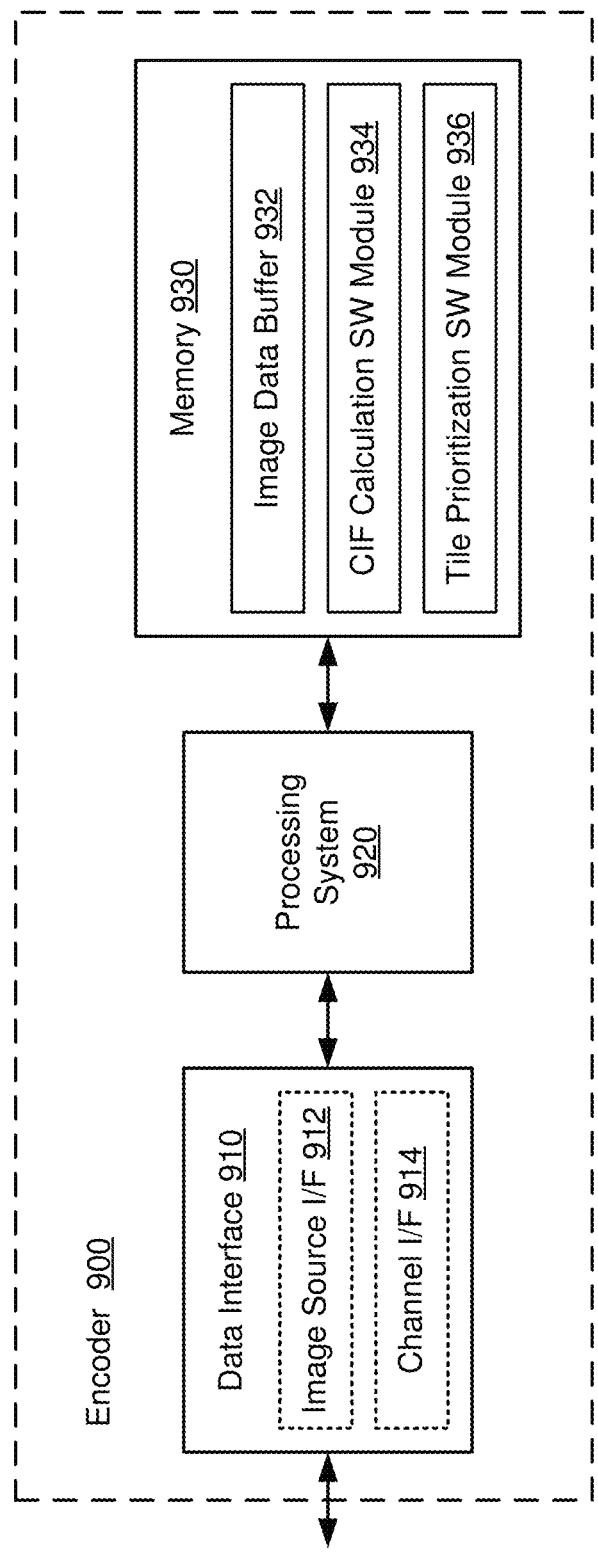
FIG. 9 shows a block diagram of an encoder, according to some implementations.

FIG. 9 shows a block diagram of an encoder 900, according to some implementations. In some implementations, the encoder 900 may be one example of the video encoder 210 of FIG. 2 or the video compression system 300 of FIG. 3. In some other implementations, the encoder 900 may be one example of the video encoding system 300 of FIG. 3 or the video compression system 700 of FIG. 7. More specifically, the encoder 900 may be configured to encode or transmit an image tile based on one or more spatial-temporal features associated with the image tile.

In some implementations, the encoder 900 may include a data interface 910, a processing system 920, and a memory 930. The data interface 910 is configured to receive image data from an image source and output encoded codewords, representing compressed image data, to a channel. In some aspects, the data interface 910 may include an image source interface (I/F) 912 to interface with the image source and a channel interface 914 to interface with the channel. In some implementations, the image source interface 912 may receive a plurality of first pixel values associated with a first image in a sequence of images (such as a video frame). More specifically, the plurality of first pixel values may represent one of a plurality of image tiles associated with the first image.

The memory 930 may include an image data buffer 932 to store the image tile and any intermediate data associated with the encoding operation. The memory 930 also may include a non-transitory computer-readable medium (including one or more nonvolatile memory elements, such as EPROM, EEPROM, Flash memory, a hard drive, and the like) that may store at least the following software (SW) modules:

a CIF SW module 934 to determine a CIF based on a degree of variation among the plurality of first pixel values, a degree of change between the plurality of first pixel values and a plurality of second pixel values associated with a second image that precedes the first image in the sequence of images, and a degree of variation among the plurality of second pixel values; and a tile prioritization SW module 936 to selectively transmit the plurality of first pixel values to a receiving device based at least in part on the CIF.

Each software module includes instructions that, when executed by the processing system 920, causes the encoder 900 to perform the corresponding functions.

The processing system 920 may include any suitable one or more processors capable of executing scripts or instructions of one or more software programs stored in the encoder 900 (such as in memory 930). For example, the processing system 920 may execute the CIF SW module 934 to determine a CIF based on a degree of variation among the plurality of first pixel values, a degree of change between the plurality of first pixel values and a plurality of second pixel values associated with a second image that precedes the first image in the sequence of images, and a degree of variation among the plurality of second pixel values. The processing system 920 also may execute the tile prioritization SW module 936 to selectively transmit the plurality of first pixel values to a receiving device based at least in part on the CIF.

Figure 10:
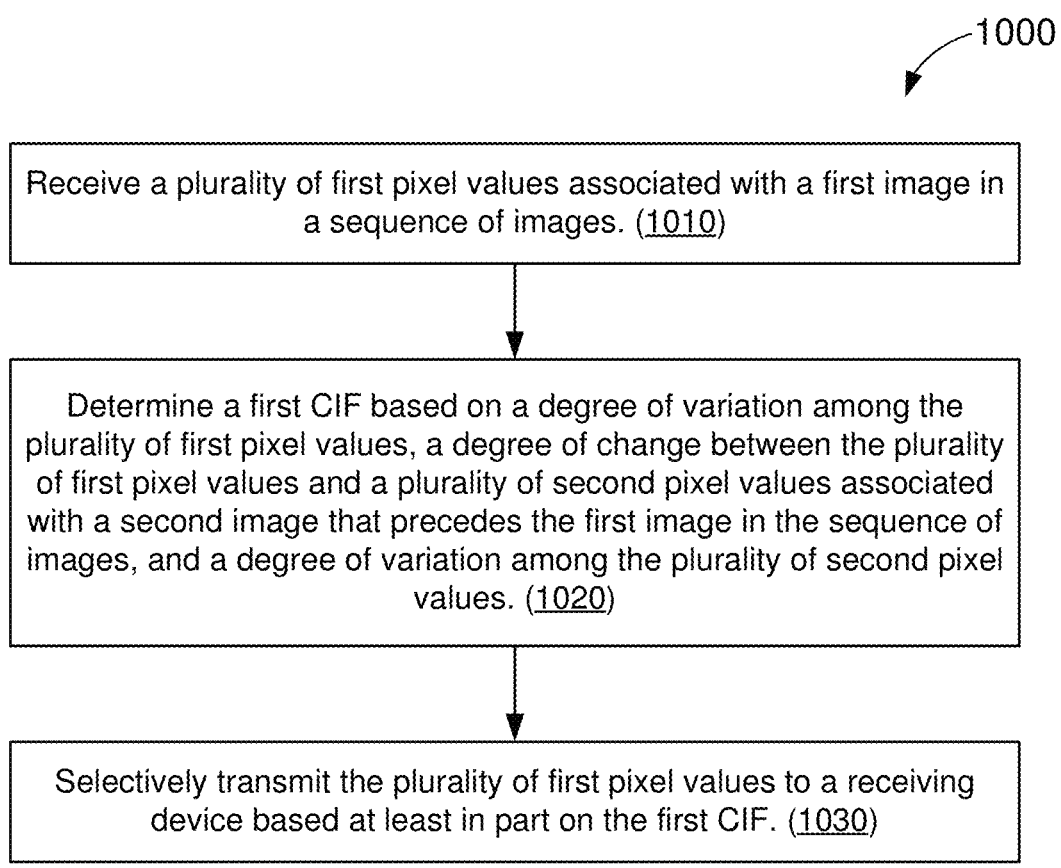
FIG. 10 shows an illustrative flowchart depicting an example operation for image transmission, according to some implementations.

FIG. 10 shows an illustrative flowchart depicting an example operation 1000 for image transmission, according to some implementations. In some implementations, the example operation 1000 may be performed by an encoder such as the video encoder 210 of FIG. 2 or the video encoding system 600 of FIG. 6. In some other implementations, the example operation 1000 may be performed by a video compression system such as any of the video compression systems 300 or 700 of FIGS. 3 and 7, respectively.

The encoder receives a plurality of first pixel values associated with a first image in a sequence of images (1010). In some implementations, the plurality of first pixel values may represent one of a plurality of image tiles associated with the first image. The encoder determines a first CIF based on a degree of variation among the plurality of first pixel values, a degree of change between the plurality of first pixel values and a plurality of second pixel values associated with a second image that precedes the first image in the sequence of images, and a degree of variation among the plurality of second pixel values (1020). The encoder selectively transmits the plurality of first pixel values to a receiving device based at least in part on the first CIF (1030).

In some implementations, the encoder may calculate a difference between each of the plurality of first pixel values and a respective one of the plurality of second pixel values; calculate the degree of change between the plurality of first pixel values and the plurality of second pixel values as a function (D[C, P]) of the differences between the plurality of first pixel values and the plurality of second pixel values; calculate a difference between each of the plurality of first pixel values and an average first pixel value associated with the plurality of first pixel values; calculate the degree of variation among the plurality of first pixel values as a function (V[C]) of the differences between the plurality of first pixel values and the average first pixel value; calculate a difference between each of the plurality of second pixel values and an average second pixel value associated with the plurality of second pixel values; and calculate the degree of variation among the plurality of second pixel values as a function (V[P]) of the differences between the plurality of second pixel values and the average second pixel value.

In some implementations, D[C, P] may be equal to the maximum of the differences between the plurality of first pixel values and the plurality of second pixel values, V[C]

may be equal to the arithmetic mean of the differences between the plurality of first pixel values and the average first pixel value, and V[P] may be equal to the arithmetic mean of the differences between the plurality of second pixel values and the average second pixel value. In some implementations, the first CIF may be determined as a ratio of D[C, P] relative to the lesser of V[C] or V [P].

In some implementations, the encoder may refrain from transmitting the plurality of first pixel values to the receiving device based on the first CIF being less than a threshold value. In some other implementations, the encoder may refrain from transmitting the plurality of first pixel values to the receiving device based on the first CIF being outside a threshold percentile of CIFs associated with the first image.

In some aspects, the encoder may further receive a plurality of third pixel values associated with the first image; determine a second CIF based on a degree of variation among the plurality of third pixel values, a degree of change between the plurality of third pixel tiles and a plurality of fourth pixel values associated with the second image, and a degree of variation among the plurality of fourth pixel values; and transmit the plurality of third pixel values to the receiving device. In some implementations, the encoder may transmit the plurality of first pixel values, to the receiving device, prior to the transmission of the plurality of third pixel values based on the first CIF being greater than the second CIF.

In some other implementations, the encoder may encode the plurality of first pixel values in accordance with one or more first encoding parameters associated with the first CIF; and encode the plurality of second pixel values in accordance with one or more second encoding parameters associated with the second CIF. In some implementations, the one or more first encoding parameters may be different than the one or more second encoding parameters based on the first CIF being different than the second CIF. In some other implementations, the one or more first encoding parameters may include a first quantization matrix and the one or more second encoding parameters may include a second quantization matrix associated with a different quality level than the first quantization matrix.

In some aspects, the encoder may update a count value based at least in part on whether the plurality of second pixel values is transmitted to the receiving device; and adjust the first CIF based on the count value. In such aspects, the plurality of first pixel values may be selectively transmitted to the receiving device based on the adjusted first CIF. In some implementations, the encoder may reset the count value based on the plurality of second pixel values being transmitted to the receiving device. In some other implementations, the encoder may increment the count value based at least in part on the plurality of second pixel values not being transmitted to the receiving device.

Figure 11:
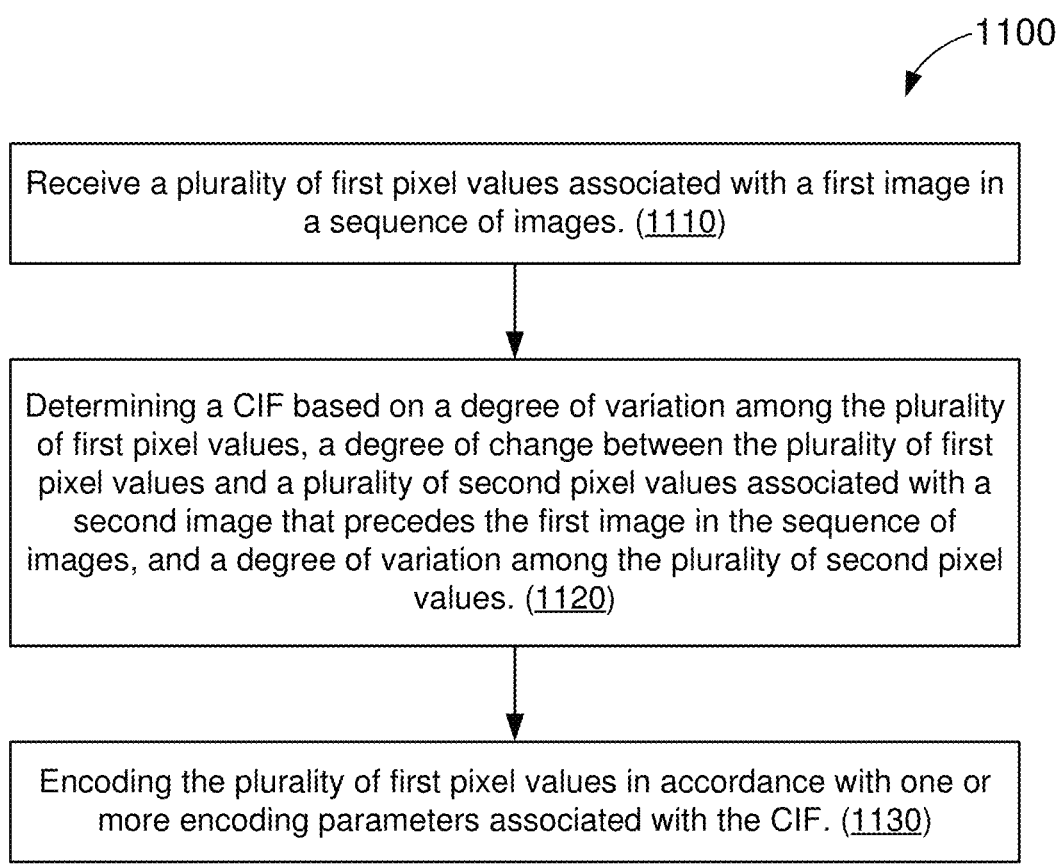
FIG. 11 shows an illustrative flowchart depicting an example operation for image encoding, according to some implementations.

FIG. 11 shows an illustrative flowchart depicting an example operation 1100 for image encoding, according to some implementations. In some implementations, the example operation 1100 may be performed by an encoder such as the video encoder 210 of FIG. 2 or the video encoding system 600 of FIG. 6. In some other implementations, the example operation 1100 may be performed by a video compression system such as any of the video compression systems 300 or 700 of FIGS. 3 and 7, respectively.

The encoder receives a plurality of first pixel values associated with a first image in a sequence of images (1110). The encoder determines a CIF based on a degree of variation among the plurality of first pixel values, a degree of change between the plurality of first pixel values and a plurality of second pixel values associated with a second image that precedes the first image in the sequence of images, and a degree of variation among the plurality of second pixel values (1120). The encoder further encodes the plurality of first pixel values in accordance with one or more encoding parameters associated with the CIF (1130). In some implementations, the one or more encoding parameters may include a quantization matrix.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

In the foregoing specification, embodiments have been described with reference to specific examples thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A method of digital image transmission, comprising:
receiving a plurality of first pixel values associated with a first image in a sequence of images;
calculating a difference between each of the plurality of first pixel values and a respective one of a plurality of second pixel values associated with a second image that precedes the first image in the sequence of images;
calculating a degree of change between the plurality of first pixel values and the plurality of second pixel values as a function (D [C, P]) of the differences between the plurality of first pixel values and the plurality of second pixel values;

calculating a difference between each of the plurality of first pixel values and an average first pixel value associated with the plurality of first pixel values;

calculating a degree of variation among the plurality of first pixel values as a function (V[C]) of the differences between the plurality of first pixel values and the average first pixel value:

calculating a difference between each of the plurality of second pixel values and an average second pixel value associated with the plurality of second pixel values;

calculating a degree of variation among the plurality of second pixel values as a function (V[P]) of the differences between the plurality of second pixel values and the average second pixel value;

determining a first change importance factor (CIF) based on the degree of variation among the plurality of first pixel values, the degree of change between the plurality of first pixel values and the plurality of second pixel values, and the degree of variation among the plurality of second pixel values; and selectively transmitting the plurality of first pixel values to a receiving device based at least in part on the first CIF.

2. The method of claim 1, wherein the plurality of first pixel values represents one of a plurality of image tiles associated with the first image.

3. The method of claim 1, wherein D [C, P] is equal to the maximum of the differences between the plurality of first pixel values and the plurality of second pixel values, V[C] is equal to the arithmetic mean of the differences between the plurality of first pixel values and the average first pixel value, and V [P] is equal to the arithmetic mean of the differences between the plurality of second pixel values and the average second pixel value.

4. The method of claim 1, wherein the first CIF is determined as a ratio of D [C, P] relative to the lesser of V[C] or V[P].

5. The method of claim 1, wherein the selective transmitting of the plurality of first pixel values comprises:
refraining from transmitting the plurality of first pixel values to the receiving device based on the first CIF being less than a threshold value.

6. The method of claim 1, wherein the selective transmitting of the plurality of first pixel values comprises:
refraining from transmitting the plurality of first pixel values to the receiving device based on the first CIF being outside a threshold percentile of CIFs associated with the first image.

7. The method of claim 1, further comprising:
receiving a plurality of third pixel values associated with the first image;
determining a second CIF based on a degree of variation among the plurality of third pixel values, a degree of change between the plurality of third pixel values and a plurality of fourth pixel values associated with the second image, and a degree of variation among the plurality of fourth pixel values; and
transmitting the plurality of third pixel values to the receiving device.

8. The method of claim 7, wherein the selective transmitting of the plurality of first pixel values comprises:
transmitting the plurality of first pixel values, to the receiving device, prior to the transmission of the plurality of third pixel values based on the first CIF being greater than the second CIF.

9. The method of claim 7, further comprising:
encoding the plurality of first pixel values in accordance with one or more first encoding parameters associated with the first CIF; and
encoding the plurality of second pixel values in accordance with one or more second encoding parameters associated with the second CIF.

10. The method of claim 9, wherein the one or more first encoding parameters are different than the one or more second encoding parameters based on the first CIF being different than the second CIF.

11. The method of claim 10, wherein the one or more first encoding parameters include a first quantization matrix and the one or more second encoding parameters include a second quantization matrix associated with a different quality level than the first quantization matrix.

12. The method of claim 1, wherein the selective transmitting of the plurality of first pixel values comprises:
updating a count value based at least in part on whether the plurality of second pixel values is transmitted to the receiving device; and
adjusting the first CIF based on the count value, the plurality of first pixel values being selectively transmitted to the receiving device based on the adjusted first CIF.

13. The method of claim 12 wherein the updating of the count value comprises:
resetting the count value based on the plurality of second pixel values being transmitted to the receiving device.

14. The method of claim 12, wherein the updating of the count value comprises:
incrementing the count value based at least in part on the plurality of second pixel values not being transmitted to the receiving device.

15. An encoder comprising:
a processing system; and
a memory storing instructions that, when executed by the processing system, causes the encoder to:
receive a plurality of first pixel values associated with a first image in a sequence of images;
calculate a difference between each of the plurality of first pixel values and a respective one of a plurality of second pixel values associated with a second image that precedes the first image in the sequence of images;
calculate a degree of change between the plurality of first pixel values and the plurality of second pixel values as a function (D [C, P]) of the differences between the plurality of first pixel values and the plurality of second pixel values;
calculate a difference between each of the plurality of first pixel values and an average first pixel value associated with the plurality of first pixel values;
calculate a degree of variation among the plurality of first pixel values as a function (V [C]) of the differences between the plurality of first pixel values and the average first pixel value;
calculate a difference between each of the plurality of second pixel values and an average second pixel value associated with the plurality of second pixel values; and
calculate a degree of variation among the plurality of second pixel values as a function (V [P]) of the differences between the plurality of second pixel values and the average second pixel value;
determine a change importance factor (CIF) based on the degree of variation among the plurality of first pixel values, the degree of change between the plurality of first pixel values and the plurality of second pixel values, and the degree of variation among the plurality of second pixel values; and selectively transmit the plurality of first pixel values to a receiving device based at least in part on the CIF.

16. The encoder of claim 15, wherein D [C, P] is equal to the maximum of the differences between the plurality of first pixel values and the plurality of second pixel values, V [C] is equal to the arithmetic mean of the differences between the plurality of first pixel values and the average first pixel value, and V [P] is equal to the arithmetic mean of the differences between the plurality of second pixel values and the average second pixel value.

17. The encoder of claim 15, wherein the CIF is determined as a ratio of D [C, P] relative to the lesser of V [C] or V[P].

18. A method of encoding, comprising:
receiving a plurality of first pixel values associated with a first image in a sequence of images;
calculating a difference between each of the plurality of first pixel values and a respective one of a plurality of second pixel values associated with a second image that precedes the first image in the sequence of images;
calculating a degree of change between the plurality of first pixel values and the plurality of second pixel values as a function of the differences between the plurality of first pixel values and the plurality of second pixel values;
calculating a difference between each of the plurality of first pixel values and an average first pixel value associated with the plurality of first pixel values;
calculating a degree of variation among the plurality of first pixel values as a function of the differences between the plurality of first pixel values and the average first pixel value;
calculating a difference between each of the plurality of second pixel values and an average second pixel value associated with the plurality of second pixel values;
calculating a degree of variation among the plurality of second pixel values as a function of the differences between the plurality of second pixel values and the average second pixel value:
determining a change importance factor (CIF) based on the degree of variation among the plurality of first pixel values, the degree of change between the plurality of first pixel values and the plurality of second pixel values, and qathe degree of variation among the plurality of second pixel values; and
encoding the plurality of first pixel values in accordance with one or more encoding parameters associated with the CIF.

* * * * *

UNITED STATES PATENT AND TRADEMARK OFFICE
CERTIFICATE OF CORRECTION

PATENT NO. : 12,010,332 B2
APPLICATION NO. : 17/861008
DATED : June 11, 2024
INVENTOR(S) : Maciej Sebastian Pedzisz It is certified that error appears in the above-identified patent and that said Letters Patent is hereby corrected as shown below:

In the Claims

In Column 26, Line 17, Claim 18, delete "average second pixel value:" and insert -- average second pixel value; --

In Column 26, Line 22, Claim 18, delete "values, and qathe degree of variation among the plu-" and insert -- values, and the degree of variation among the plu- --

Signed and Sealed this
Tenth Day of December, 2024

Katherine Kelly Vidal
*Director of the United States Patent and Trademark Office*